(12) United States Patent
Matsuzaka et al.

(10) Patent No.: US 8,290,278 B2
(45) Date of Patent: Oct. 16, 2012

(54) SPECIFYING POSITION OF CHARACTERISTIC PORTION OF FACE IMAGE

(75) Inventors: Kenji Matsuzaka, Shiojiri (JP); Masaya Usui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 12/702,202

(22) Filed: Feb. 8, 2010

(65) Prior Publication Data

US 2010/0202697 A1    Aug. 12, 2010

(30) Foreign Application Priority Data

Feb. 10, 2009  (JP) ................................ 2009-028192

(51) Int. Cl.
*G06K 9/00* (2006.01)
(52) U.S. Cl. ........................................ 382/190; 382/209
(58) Field of Classification Search .................. 382/100, 382/190, 209
See application file for complete search history.

(56) References Cited

U.S. PATENT DOCUMENTS

| | | | | |
|---|---|---|---|---|
| 5,164,992 A | * | 11/1992 | Turk et al. | 382/118 |
| 6,173,068 B1 | * | 1/2001 | Prokoski | 382/115 |
| 7,254,257 B2 | * | 8/2007 | Kim et al. | 382/118 |
| 7,620,218 B2 | * | 11/2009 | Steinberg et al. | 382/118 |
| 7,916,897 B2 | * | 3/2011 | Corcoran et al. | 382/103 |
| 2007/0047775 A1 | | 3/2007 | Okubo | |
| 2007/0098231 A1 | | 5/2007 | Minato | |

FOREIGN PATENT DOCUMENTS

| | | |
|---|---|---|
| JP | 2003-248815 A | 9/2003 |
| JP | 2007-065766 A | 3/2007 |
| JP | 2007-128262 A | 5/2007 |
| JP | 2007-141107 A | 6/2007 |

* cited by examiner

*Primary Examiner* — Stephen R Koziol
(74) *Attorney, Agent, or Firm* — Kilpatrick Townsend & Stockton LLP

(57) ABSTRACT

There is provided an image processing apparatus that specifies a position of a predetermined characteristic portion of a target face image.

11 Claims, 15 Drawing Sheets

SHAPE s OF SAMPLE FACE IMAGE SI    AVERAGE SHAPE $s_0$

|      | PERSONAL ID | CP(0)-X | CP(0)-Y | CP(1)-X | CP(1)-Y | ... | CP(67)-X | CP(67)-Y |
|------|-------------|---------|---------|---------|---------|-----|----------|----------|
| SI(1) | 1 | 150 | 100 | 153 | 110 | ... | 140 | 150 |
| SI(2) | 1 | 50  | 120 | 50  | 133 | ... | 57  | 181 |
| SI(2) | 2 | 121 | 78  | 122 | 88  | ... | 135 | 121 |
| SI(3) | 1 | 45  | 35  | 48  | 44  | ... | 55  | 89  |
| ⋮    | ⋮ | ⋮   | ⋮   | ⋮   | ⋮   | ⋮   | ⋮   | ⋮   |

AVERAGE SHAPE $s_0$

AVERAGE SHAPE $s_0$

SPECIFYING POSITION OF CHARACTERISTIC PORTION OF FACE IMAGE

Priority is claimed under 35 U.S.C. §119 to Japanese Application No. 2009-028192 filed on Feb. 10, 2009, which is hereby incorporated by reference in its entirety.

BACKGROUND

1. Technical Field

The present invention relates to technology for specifying the positions of predetermined characteristic portions of a face image.

2. Related Art

As a technique for modeling a visual event, an active appearance model (also abbreviated as "AAM") has been known. In the AAM, for example, by performing statistical analysis on the positions (coordinates) and pixel values (for example, luminance values) of predetermined characteristic portions (for example, an eye area, a nose tip, and a face line) of a plurality of sample face images, a shape model that represents the face shape specified by the positions of the characteristic portions and a texture model that represents the "appearance" in an average shape are set, and a face image is modeled by using such models. According to the AAM, any arbitrary target face image can be modeled (synthesized), and the positions of the characteristic portions in the target face image can be specified (detected) (for example, see JP-A-2007-141107).

In the above-described typical technology, there is room for improving the accuracy of specifying the positions of the predetermined characteristic portions of a face image.

In addition, such a problem is not limited to a case where the AAM is used and is a common problem when image processing is performed for specifying the positions of predetermined characteristic portions of a face image.

SUMMARY

An advantage of some aspects of the invention is that it provides technology for improving the accuracy of the process for specifying the positions of predetermined characteristic portions of a face image.

The invention can be implemented in the following forms or applications.

Application 1

There is provided an image processing apparatus that specifies a position of a predetermined characteristic portion of a target face image. The image processing apparatus includes: an initial disposition unit that determines an initial disposition of a characteristic point of the target face image based on a disposition of the characteristic point of a reference face image that is set based on a statistical analysis of a plurality of sample face images of which dispositions of the characteristic points representing the positions of the characteristic portions are known; an image transforming unit that performs a first transformation for at least one of the reference face image and the target face image, so that disposition patterns of the characteristic points of the reference face image and the target face image are identical to each other; a normalization unit that performs a first normalization process, in which predetermined first index values that represent distributions of pixel values of the reference face image and the target face image approach each other, for at least one of the reference face image and the target face image after the first transformation; a determination unit that compares the reference face image with the target face image after the first normalization process and determines whether to update the disposition of the characteristic point of the target face image based on a result of the comparison; and an update unit that updates the disposition of the characteristic point of the target face image based on the result of the comparison between the reference face image and the target face image in a case where the update is determined to be performed.

According to the above-described image processing apparatus, the initial disposition of a characteristic point of the target face image is determined based on the disposition of the characteristic point of a reference face image, and a first transformation is performed for at least one of the reference face image and the target face image, so that disposition patterns of the characteristic points of the reference face image and the target face image are identical to each other. Then, it is determined whether to update the disposition of the characteristic point of the target face image based on the result of comparing the reference face image with the target face image, and the disposition of the characteristic point of the target face image is updated based on the result of comparing the reference face image with the target face image in a case where the update is determined to be performed. Here, according to the above-described image processing apparatus, after the first normalization process, in which predetermined first index values that represent distributions of pixel values of the reference face image and the target face image approach each other, is performed for at least one of the reference face image and the target face image, whether to update the disposition of the characteristic point is determined based on the result of comparing the reference face image with the target face image. Accordingly, the influence of the characteristics of the distribution of pixel values of the target face image on the result of the comparison is suppressed, whereby the accuracy of determination on whether to update the disposition of the characteristic point is improved, and the accuracy of update of the disposition of the characteristic point is improved as well. Therefore, according to the above-described image processing apparatus, the accuracy of the position specifying process for a predetermined characteristic portion of a face image is improved.

Application 2

In the image processing apparatus according to Application 1, the determination unit calculates a predetermined second index value that represents the degree of difference between the reference face image and the target face image based on the result of comparing the reference face image with the target face image and determines whether to perform the update based on the result of comparing the second index value with a threshold value.

According to the above-described image processing apparatus, after the first normalization process is performed, the predetermined second index value that represents the degree of difference between the reference face image and the target face image is calculated. Then, whether to update the disposition of the characteristic point is determined based on the result of comparing the second index value with a threshold value. Accordingly, a determination can be made by using a threshold value, whereby the processing speed and the accuracy of the process are improved.

Application 3

In the image processing apparatus according to Application 1 or 2, the normalization unit performs a second normalization process, in which the first index values of the reference face image and the target face image approach each other, for at least one of the reference face image and the target face image in a reference correspondence relationship, which is a correspondence relationship between the reference face image and the target face image, that becomes a reference and transformed correspondence relationships of N types that are correspondence relationships between the reference face image and the target face image at a time when the second transformations of N (here, N is an integer equal to or greater than one) types are performed for at least one of the reference face image and the target face image with reference to the reference correspondence relationship. In addition, the initial disposition unit selects the correspondence relationship, for which the degree of difference between the reference face image and the target face image after the second normalization process is the smallest, from among the reference correspondence relationship and the transformed correspondence relationships and determines the initial disposition of the characteristic point of the target face image based on the disposition of the characteristic point of the reference face image in the selected correspondence relationship.

According to the above-described image processing apparatus, the correspondence relationship, for which the degree of difference degree between the reference face image and the target face image after the second normalization process is the smallest, is selected from among the reference correspondence relationship and the transformed correspondence relationships, and the initial disposition of the characteristic point of the target face image is determined based on the disposition of the characteristic point of the reference face image in the selected correspondence relationship. Accordingly, the influence of the characteristics of the distribution of pixel values of the target face image on the selection of the correspondence relationship is suppressed, whereby the accuracy of the initial disposition of the characteristic point is improved. Therefore, according to the above-described apparatus, the accuracy and the processing speed of the position specifying process for the predetermined characteristic portion of a face image are improved.

Application 4

In the image processing apparatus according to Application 3, the second transformations of N types are transformations in which at least one of parallel movement, a change in tilt, and enlargement or reduction of the entire characteristic point is performed.

According to the above-described image processing apparatus, the transformed correspondence relationship is set by a transformation in which at least one of parallel movement, a change in tilt, and enlargement or reduction of the entire characteristic point is performed. Accordingly, the initial disposition of the characteristic point is determined based on the transformed correspondence relationship in which a difference in the entire disposition of the characteristic points is large. Therefore, the efficiency, the processing speed, and the accuracy of the position specifying process for the characteristic portion of a face image are improved.

Application 5

In the image processing apparatus according to any one of Applications 1 to 4, the first index value includes at least one of an average value and a variance value of pixel values.

According to the above-described image processing apparatus, after the first normalization process in which at least one side of the average values and the variance values of pixels of the reference face image and the target face image approach each other is performed for at least one of the reference face image and the target face image, whether to perform update of the disposition of the characteristic point is determined based on the result of comparing the reference face image with the target face image. Accordingly, the influence of the characteristics of the distribution of pixel values of the target face image on the result of the comparison is suppressed, whereby the accuracy of determination on whether to update the disposition of the characteristic point is improved, and the accuracy of update of the disposition of the characteristic point is improved as well.

Application 6

In the image processing apparatus according to any one of Applications 1 to 5, the reference face image is an average image of the plurality of sample face images that has been transformed such that the disposition of the characteristic point is identical to an average shape that represents an average position of the characteristic points of the plurality of sample face images.

According to the above-described image processing apparatus, an average image of the plurality of sample face images that has been transformed such that the disposition of the characteristic point is identical to the average shape is used as the reference face image. Accordingly, the accuracy of the position specifying process for the characteristic portion is improved for all the face images.

Application 7

In the image processing apparatus according to any one of Applications 1 to 6, a face area detecting unit that detects an image area, which includes at least a part of a face image, from the target face image as a face area is further included. In addition, the initial disposition unit that determines the initial disposition of the characteristic point in the target face image based on at least one of the position, the size, and the tilt of the face area of the target face image.

According to the image processing apparatus, a face area is detected, and the initial disposition of the characteristic point in the target face image is determined based on at least one of the position, the size, and the tilt of the face area. Accordingly, the initial disposition of the characteristic point in the target face image can be determined efficiently with high accuracy.

Application 8

In the image processing apparatus according to any one of Applications 1 to 7, the first transformation is an affine transformation for each polygonal area having the characteristic points set in the reference face image and the target face image as apexes thereof.

According to the above-described image processing apparatus, the first transformation in which the disposition patterns of the characteristic points of the reference face image and the target face image are identical to each other can be performed.

Application 9

In the image processing apparatus according to Applications 1 to 8, a memory unit storing model information, which is used for specifying the disposition model of the characteristic point that is a model of the characteristic point set based on the statistical analysis and is acquired by a sum of an average shape that represents an average position of the characteristic points of the plurality of sample face images and a linear combination of shape vectors representing the characteristics of the disposition of the characteristic points of the plurality of sample face images therein, is further included. In addition, the update unit updates the disposition of the characteristic point of the target face image by changing a coefficient of at least one of the shape vectors in the disposition model that represents the disposition of the characteristic point of the target face image based on the result of comparing the reference face image with the target face image.

According to the above-described image processing apparatus, by changing the coefficient of at least one of shape vectors included in a disposition model that represents the disposition of the characteristic point of the target face image based on the result of comparing the reference face image with the target face image, the disposition of the characteristic point in the target face image is updated. Therefore, the efficiency, the processing speed, and the accuracy of the position specifying process for the characteristic portion of a face image are improved.

In addition, the invention can be implemented in various forms. For example, the invention can be implemented in the forms of an image processing method, an image processing apparatus, a characteristic position specifying method, a characteristic position specifying apparatus, a facial expression determining method, a facial expression determining apparatus, a printing method, a printing apparatus, a computer program for implementing the functions of the above-described method or apparatus, a recording medium having the computer program recorded thereon, a data signal implemented in a carrier wave including the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
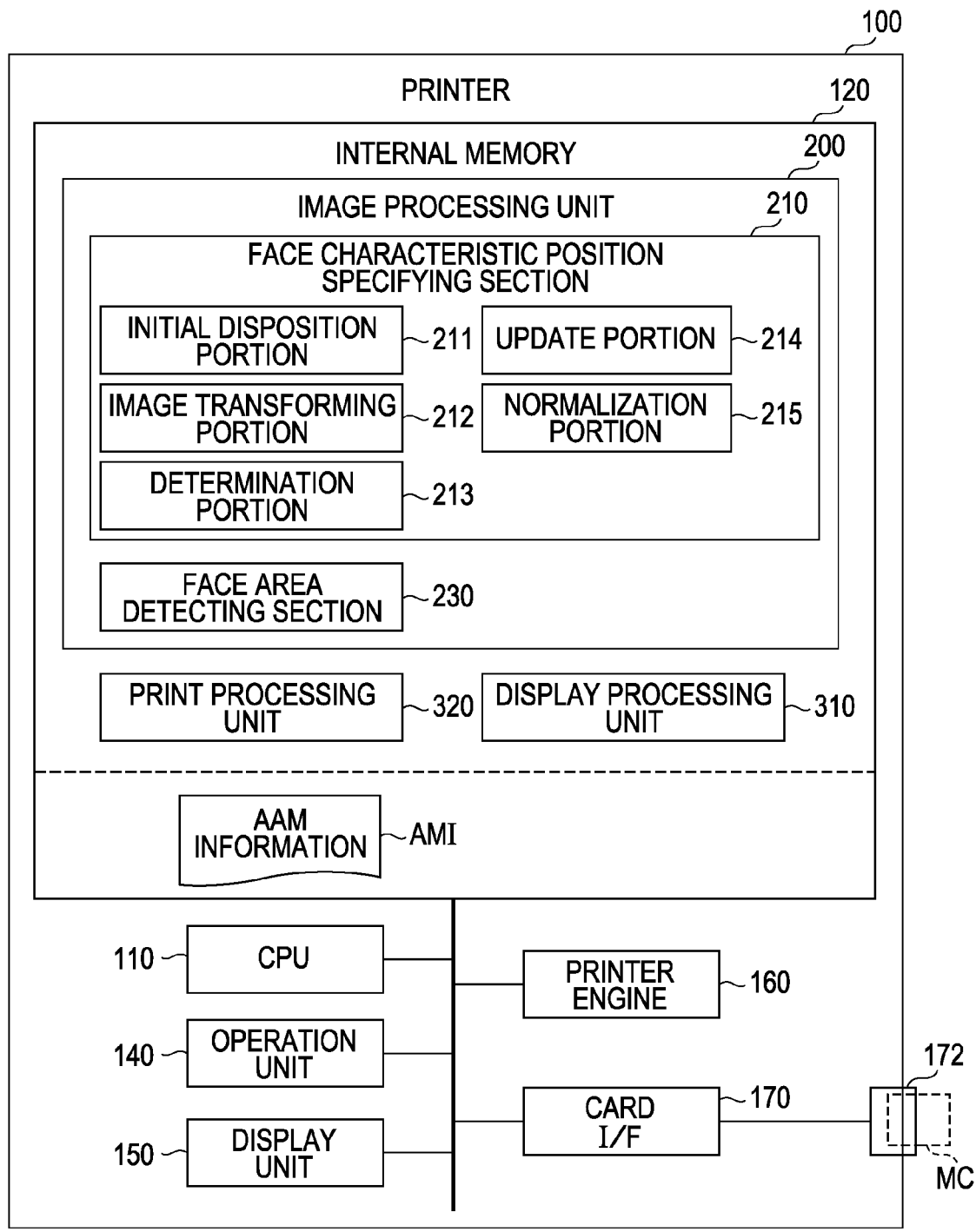
FIG. 1 is an explanatory diagram schematically showing the configuration of a printer as an image processing apparatus according to a first embodiment of the invention.

Hereinafter, embodiments of the invention will be described in the following order.
A. First Embodiment
A1. Configuration of Image Processing Apparatus
A2. AAM Setting Process
A3. Face Characteristic Position Specifying Process
B. Second Embodiment
C. Modified Examples
A. First Embodiment
A1. Configuration of Image Processing Apparatus FIG. 1 is an explanatory diagram schematically showing the configuration of a printer 100 as an image processing apparatus according to a first embodiment of the invention. The printer 100 according to this embodiment is a color ink jet printer corresponding to so-called direct printing in which an image is printed based on image data that is acquired from a memory card MC or the like. The printer 100 includes a CPU 110 that controls each unit of the printer 100, an internal memory 120 that is configured by a ROM, and a RAM, an operation unit 140 that is configured by buttons or a touch panel, a display unit 150 that is configured by a liquid crystal display, a printer engine 160, and a card interface (card I/F) 170. In addition, the printer 100 may be configured to include an interface that is used for performing data communication with other devices (for example, a digital still camera or a personal computer). The constituent elements of the printer 100 are interconnected through a bus with one another.

The printer engine 160 is a printing mechanism that performs a printing operation based on the print data. The card interface 170 is an interface that is used for exchanging data with a memory card MC inserted into a card slot 172. In this embodiment, an image file that includes the image data is stored in the memory card MC.

In the internal memory 120, an image processing unit 200, a display processing unit 310, and a print processing unit 320 are stored. The image processing unit 200 is a computer program for performing a face characteristic position specifying process under a predetermined operating system. The face characteristic position specifying process is a process for specifying (detecting) the positions of predetermined characteristic portions (for example, an eye area, a nose tip, or a face line) in a face image. The face characteristic specifying process will be described later in details.

The image processing unit 200 includes a face characteristic position specifying section 210 and a face area detecting section 230 as program modules. The face characteristic position specifying section 210 includes an initial disposition portion 211, an image transforming portion 212, a determination portion 213, an update portion 214, and a normalization portion 215. The functions of these portions will be described in details in a description of the face characteristic position specifying process to be described later.

The display processing unit 310 is a display driver that displays a process menu, a message, an image, or the like on the display unit 150 by controlling the display unit 150. The print processing unit 320 is a computer program that generates print data based on the image data and prints an image based on the print data by controlling the printer engine 160. The CPU 110 implements the functions of these units by reading out the above-described programs (the image processing unit 200, the display processing unit 310, and the print processing unit 320) from the internal memory 120 and executing the programs.

In addition, AAM information AMI is stored in the internal memory 120. The AAM information AMI is information that is set in advance in an AAM setting process to be described later and is referred to in the face characteristic position specifying process to be described later. The content of the AAM information AMI will be described in detail in a description of the AAM setting process to be described later.

A2. AAM Setting Process

Figure 2:
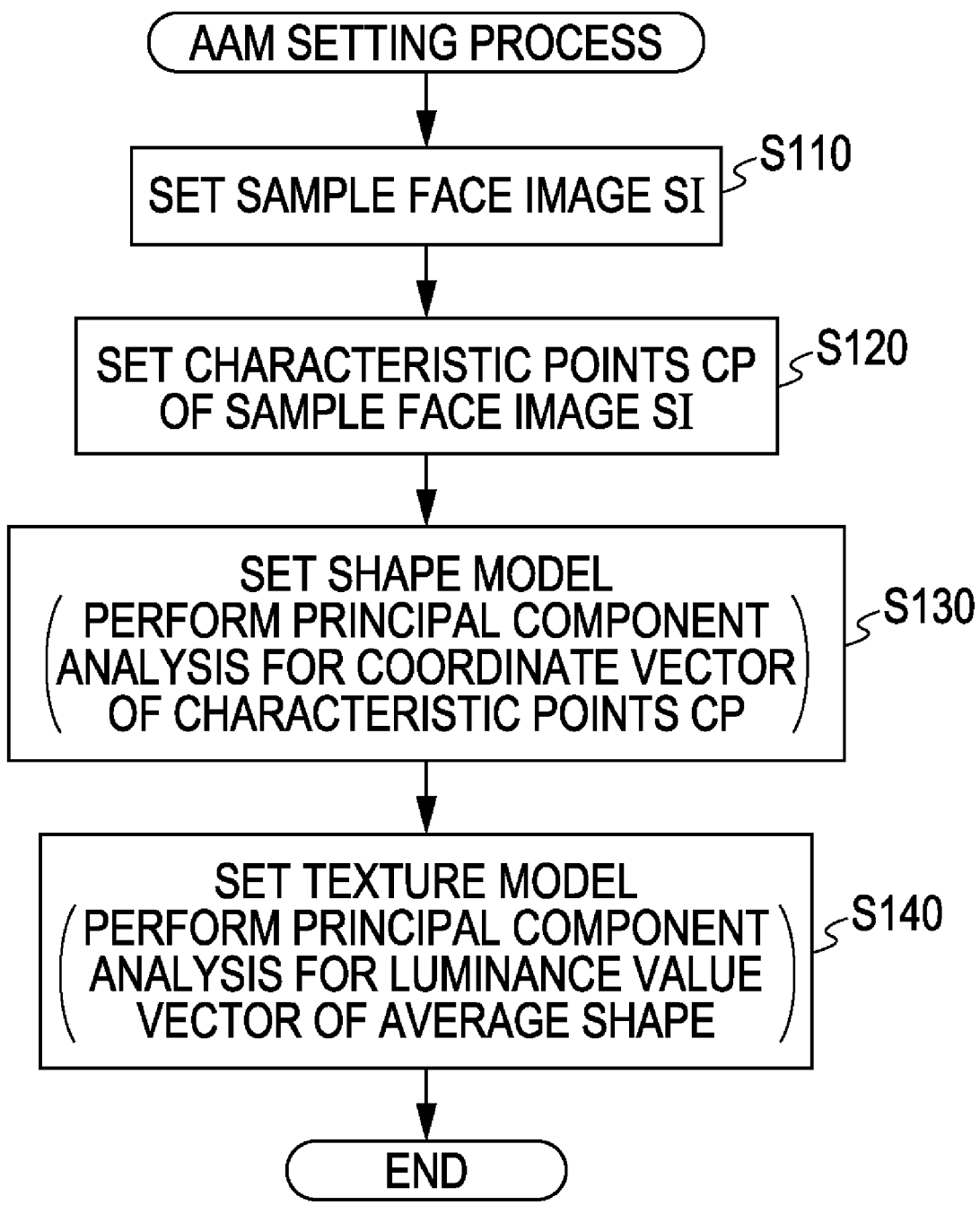
FIG. 2 is a flowchart representing the flow of an AAM setting process in the first embodiment.

FIG. 2 is a flowchart representing the flow of the AAM setting process in the first embodiment. The AAM setting process is a process for setting a shape model and a texture model that are used in image modeling called an AAM (Active Appearance Model).

Figure 3:
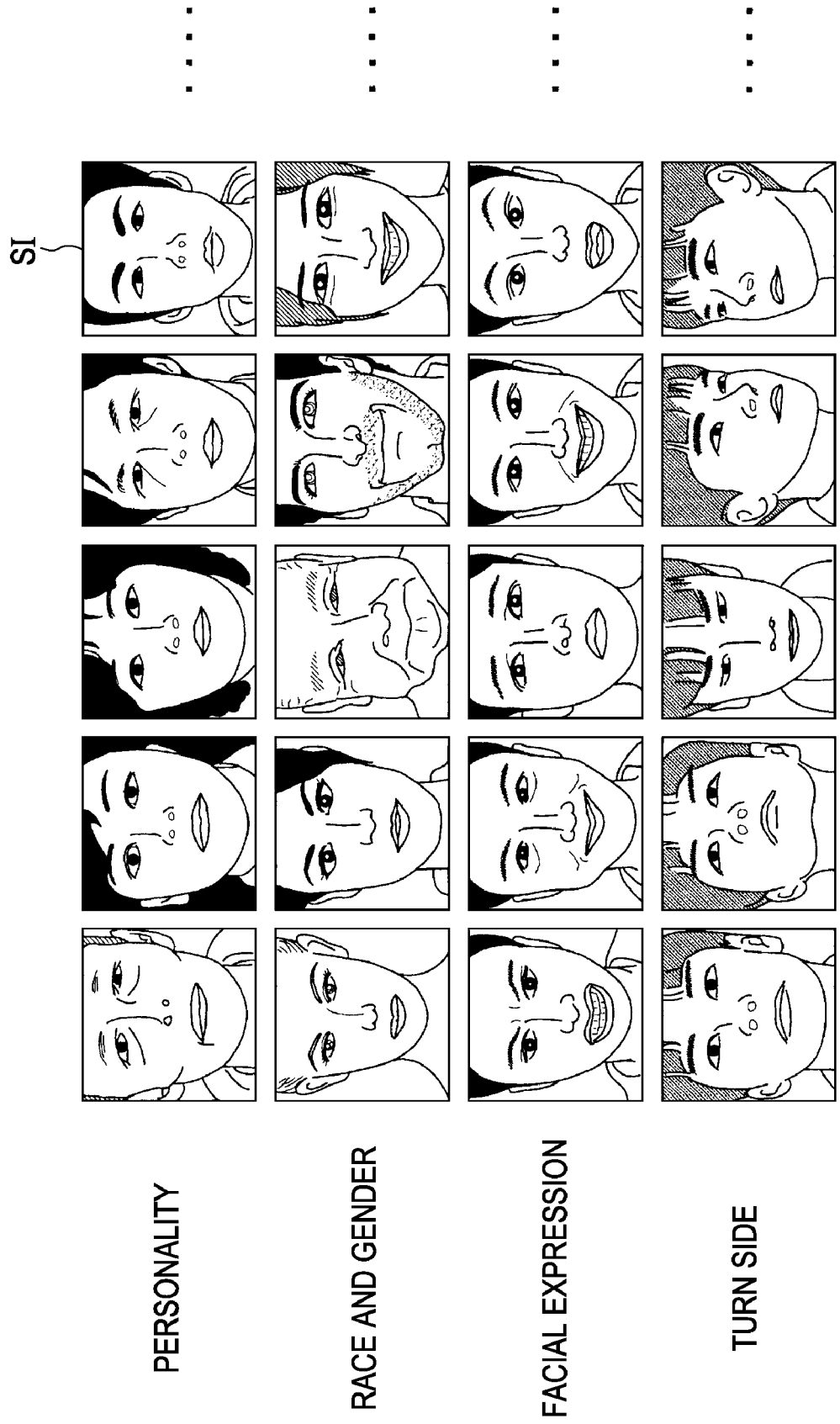
FIG. 3 is an explanatory diagram showing an example of sample face images.

In Step S110, a plurality of images representing person's faces are set as sample face images SI. FIG. 3 is an explanatory diagram showing an example of the sample face images SI. As represented in FIG. 3, the sample face images SI are set such that face images having different attributes for various attributes such as personality, race, gender, facial expression (anger, laughter, troubled, surprise, or the like), and a direction (front-side turn, upward turn, downward turn, right-side turn, left-side turn, or the like). When the sample face images SI are set in such a manner, all the face images can be modeled with high accuracy by the AAM. Accordingly, the face characteristic position specifying process (to be described later) can be performed with high accuracy for all the face images. The sample face images SI are also referred to as learning face images.

Figures 4, 5:
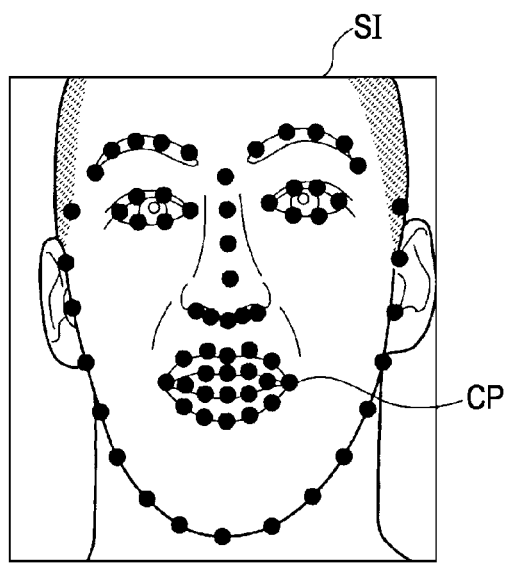
FIG. 4 is an explanatory diagram representing an example of a method of setting characteristic points of a sample face image.
FIG. 5 is an explanatory diagram showing an example of the coordinates of the characteristic points set in the sample face image.

In Step S120 (FIG. 2), the characteristic points CP are set for each sample face image SI. FIG. 4 is an explanatory diagram representing an example of a method of setting the characteristic points CP of a sample face image SI. The characteristic points CP are points that represent the positions of predetermined characteristic portions of the face image. In this embodiment, as the predetermined characteristic portions, 68 portions of a person's face that include predetermined positions on the eyebrows (for example, end points, four-division points, or the like; the same in description below), predetermined positions on the contour of the eyes, predetermined positions on contours of the bridge of the nose and the wings of the nose, predetermined positions on the contours of upper and lower lips, and predetermined positions on the contour (face line) of the face are set. In other words, in this embodiment, predetermined positions of contours of organs (eyebrows, eyes, a nose, and a mouth) of a face and the face that are commonly included in a person's face are set as the characteristic portions. As shown in FIG. 4, the characteristic points CP are set (disposed) to positions that represent 68 characteristic portions designated by an operator for each sample face image SI. The characteristic points CP set as described above correspond to the characteristic portions, and accordingly it can be represented that the disposition of the characteristic points CP in a face image specifies the shape of the face.

The position of each characteristic point CP in a sample face image SI is specified by coordinates. FIG. 5 is an explanatory diagram showing an example of the coordinates of the characteristic points CP set in the sample face image SI. In FIG. 5, SI(j) (j=1, 2, 3 ...) represents each sample face image SI, and CP(k) (k=0, 1, ..., 67) represents each characteristic point CP. In addition, CP(k)-X represents the X coordinate of the characteristic point CP(k), and CP(k)-Y represents the Y coordinate of the characteristic point CP(k). As the coordinates of the characteristic point CP, coordinates set by using a predetermined reference point (for example, a lower left point in an image) in a sample face image SI that is normalized for the face size, the face tilt (a tilt within the image surface), and the positions of the face in the X direction and the Y direction as the origin point are used. In addition, in this embodiment, a case where a plurality of person's images is included in one sample face image SI is allowed (for example, two faces are included in a sample face image SI(2)), and the persons included in one sample face image SI are specified by personal IDs.

In Step S130 (FIG. 2), a shape model of the AAM is set. In particular, the face shape s that is specified by the positions of the characteristic points CP is modeled by the following Equation (1) by performing a principal component analysis for a coordinate vector (see FIG. 5) that is configured by the coordinates (X coordinates and Y coordinates) of 68 characteristic points CP in each sample face image SI. In addition, the shape model is also called a disposition model of characteristic points CP.

Equation (1)

$$s = s_0 + \sum_{i=1}^{n} p_i s_i \quad (1)$$

Figure 6A:
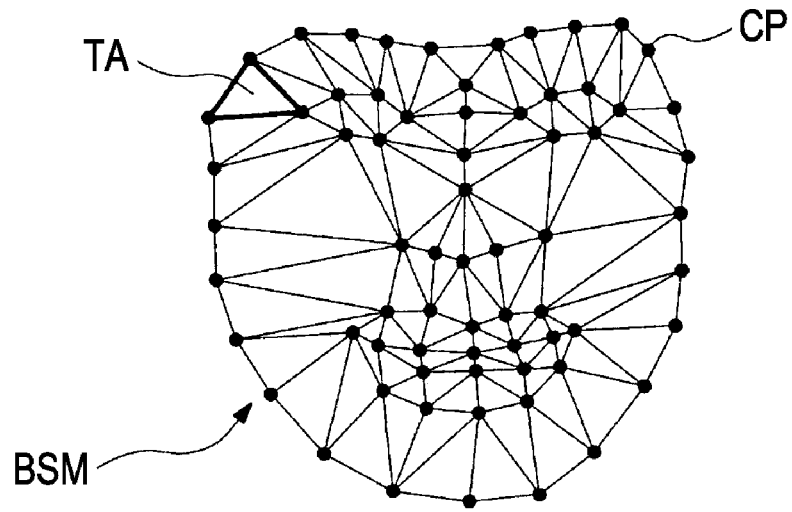
FIGS. 6A and 6B are explanatory diagrams showing an example of an average shape.
Figure 6B:
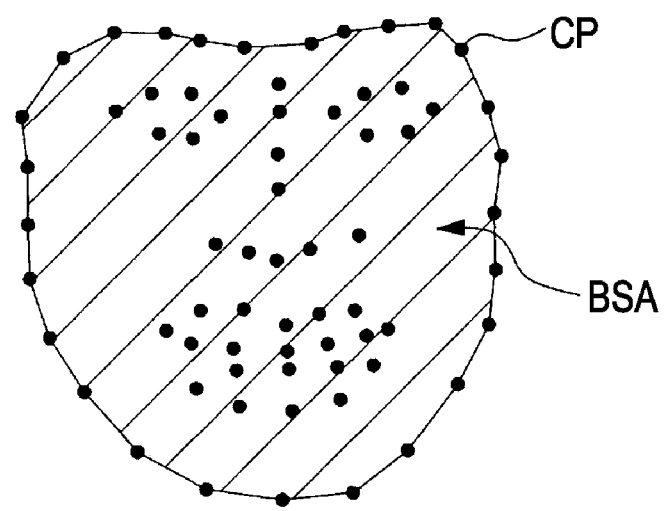

In the above-described Equation (1), $s_0$ is an average shape. FIGS. 6A and 6B are explanatory diagrams showing an example of the average shape $s_0$. As shown in FIGS. 6A and 6B, the average shape $s_0$ is a model that represents an average face shape that is specified by average positions (average coordinates) of each characteristic point CP of the sample face image SI. In this embodiment, an area (denoted by being hatched in FIG. 6B) surrounded by straight lines enclosing characteristic points CP (characteristic points CP corresponding to the face line, the eyebrows, and a region between the eyebrows; see FIG. 4) located on the outer periphery of the average shape $s_0$ is referred to as an "average shape area BSA". The average shape $s_0$ is set such that, as shown in FIG. 6A, a plurality of triangle areas TA having the characteristic points CP as their vertexes divides the average shape area BSA into mesh shapes. Here, a mesh of the average shape $s_0$ that is configured by the characteristic points CP and the outline of the triangle areas TA is referred to as an "average shape mesh BSM".

In the above-described Equation (1) representing a shape model, $s_i$ is a shape vector, $p_i$ is a shape parameter that represents the weight of the shape vector $s_i$. The shape vector $s_i$ is a vector that represents the characteristics of the face shape s. In particular, the shape vector $s_i$ is an eigenvector corresponding to an i-th principal vector that is acquired by performing principal component analysis. In other words, n eigenvectors that are set based on the accumulated contribution rates in the order of eigenvectors corresponding to principal components having a larger variance are used as the shape vectors $s_i$. In this embodiment, a first shape vector $s_1$ that corresponds to a first principal component having the largest variance becomes a vector that is approximately correlated with the horizontal appearance of a face, and a second shape vector $s_2$ corresponding to a second principal component that has the second largest variance is a vector that is approximately correlated with the vertical appearance of a face. In addition, a third shape vector $s_3$ corresponding to a third principal component having the third largest variance becomes a vector that is approximately correlated with the aspect ratio of a face, and a fourth shape vector $s_4$ corresponding to a fourth principal component having the fourth largest variance becomes a vector that is approximately correlated with the degree of opening of a mouth.

As shown in the above-described Equation (1), in the shape model according to this embodiment, a face shape s that represents the disposition of the characteristic points CP is modeled as a sum of an average shape $s_0$ and a linear combination of n shape vectors $s_i$. By appropriately setting the shape parameter $p_i$ for the shape model, the face shape s in all the images can be reproduced. In addition, the average shape $s_0$ and the shape vector $s_i$ that are set in the shape model setting step (Step S130 in FIG. 2) are stored in the internal memory 120 as the AAM information AMI (FIG. 1). The average shape $s_0$ and the shape vector $s_i$ as the AAM information AMI corresponds to model information according to an embodiment of the invention.

In Step S140 (FIG. 2), a texture model of the AAM is set. In particular, first, image transformation (hereinafter, also referred to as "warp W") is performed for each sample face image SI, so that the disposition of the characteristic points CP in the sample face image SI is identical to that of the characteristic points CP in the average shape $s_0$.

Figure 7:
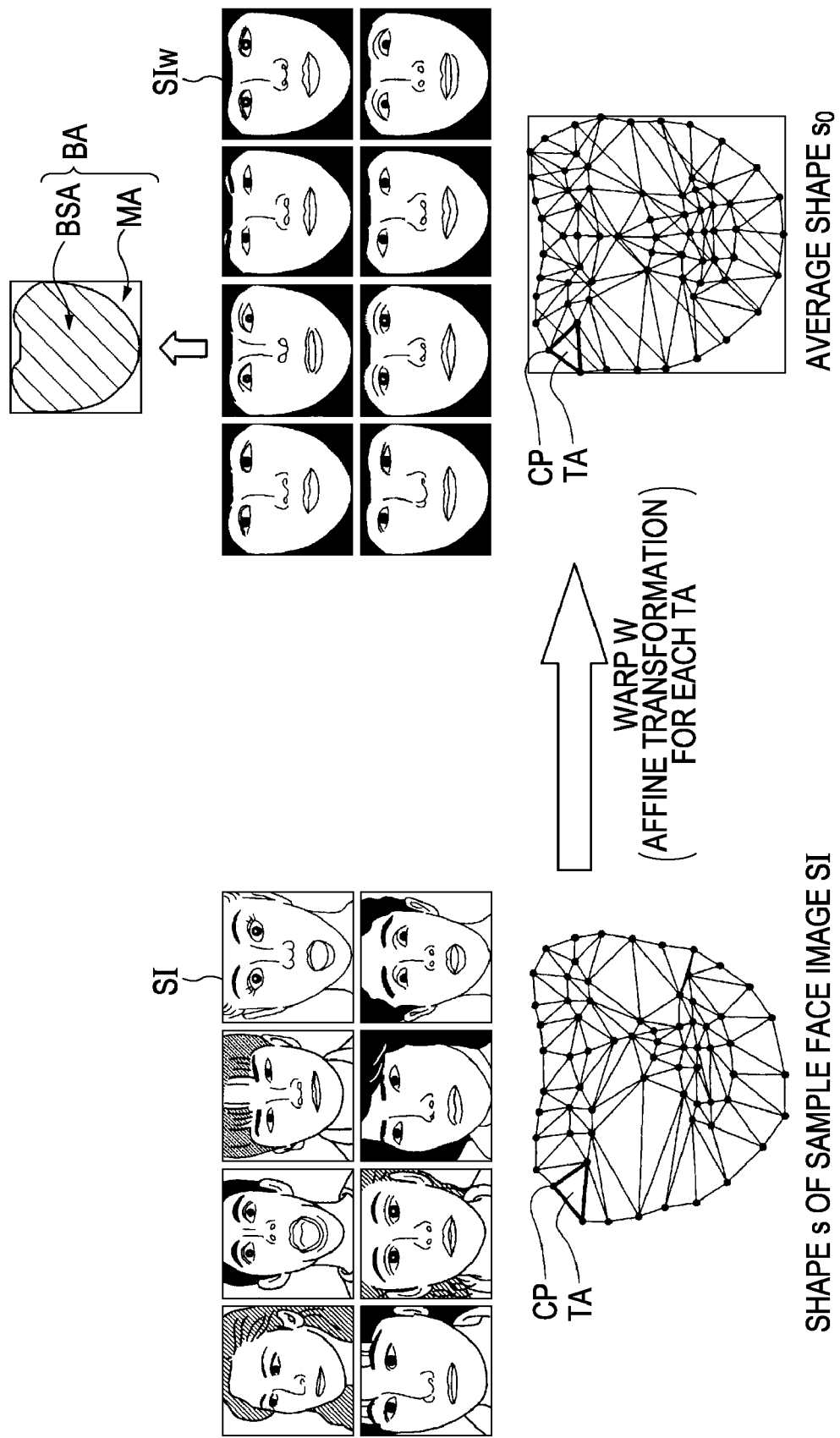
FIG. 7 is an explanatory diagram showing an example of a warp method for a sample face image.

FIG. 7 is an explanatory diagram showing an example of a warp W method for a sample face image SI. For each sample face image SI, similar to the average shape $s_0$, a plurality of triangle areas TA that divides an area surrounded by the characteristic points CP located on the outer periphery into mesh shapes is set. The warp W is an affine transformation set for each of the plurality of triangle areas TA. In other words, in the warp W, an image of triangle areas TA in a sample face image SI is transformed into an image of corresponding triangle areas TA in the average shape $s_0$ by using the affine transformation method. By using the warp W, a sample face image SI (hereinafter, referred to as a "sample face image SIw") having the same disposition as that of the characteristic points CP of the average shape $s_0$ is generated.

In addition, each sample face image SIw is generated as an image in which an area (hereinafter, also referred to as a "mask area MA") other than the average shape area BSA is masked by using the rectangular range including the average shape area BSA (denoted by being hatched in FIG. 7) as the outer periphery. An image area acquired by summing the average shape area BSA and the mask area MA is referred to as a reference area BA. In addition, each sample face image SIw is normalized, for example, as an image having the size of 56 pixels×56 pixels.

Next, the texture (also referred to as an "appearance") A(x) of a face is modeled by using the following Equation (2) by performing principal component analysis for a luminance value vector that is configured by luminance values for each pixel group x of each sample face image SIw. In addition, the pixel group x is a set of pixels that are located in the average shape area BSA.

Equation (2)

$$A(x) = A_0(x) + \sum_{i=1}^{m} \lambda_i A_i(x) \quad (2)$$

Figure 8:
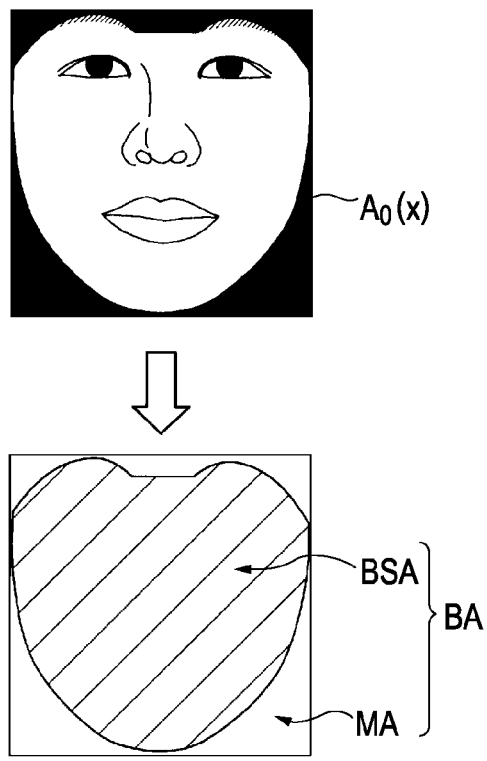
FIG. 8 is an explanatory diagram showing an example of an average face image.

In the above-described Equation (2), $A_0(x)$ is an average face image. FIG. 8 is an explanatory diagram showing an example of the average face image $A_0(x)$. The average face image $A_0(x)$ is an average face of sample face images SIw (see FIG. 7) after the warp W. In other words, the average face image $A_0(x)$ is an image that is calculated by taking an average of pixel values (luminance values) of pixel groups x located within the average shape area BSA of the sample face image SIw. Accordingly, the average face image $A_0(x)$ is a model that represents the texture (appearance) of an average face in the average face shape. In addition, the average face image $A_0(x)$, similarly to the sample face image SIw, is configured by an average shape area BSA and a mask area MA and, for example, is calculated as an image having the size of 56 pixels×56 pixels. In addition, also for the average face image $A_0(x)$, an image area acquired by adding the average shape area BSA and the mask area MA together is called a reference area BA. The average face image $A_0(x)$ corresponds to a reference face image according to an embodiment of the invention.

In the above-described Equation (2) representing a texture model, $A_i(x)$ is a texture vector, $\lambda_i$ is a texture parameter that represents the weight of the texture vector $A_i(x)$. The texture vector $A_i(x)$ is a vector that represents the characteristics of the texture A(x) of a face. In particular, the texture vector $A_i(x)$ is an eigenvector corresponding to an i-th principal component that is acquired by performing principal component analysis. In other words, m eigenvectors set based on the accumulated contribution rates in the order of the eigenvectors corresponding to principal components having larger variances are used as a texture vector $A_i(x)$. In this embodiment, the first texture vector $A_i(x)$ corresponding to the first principal component having the largest variance becomes a vector that is approximately correlated with a change in the color of a face (may be perceived as a difference in gender).

As shown in the above-described Equation (2), in the texture model according to this embodiment, the face texture A(x) representing the outer appearance of a face is modeled as a sum of the average face image $A_0(x)$ and a linear combination of m texture vectors $A_i(x)$. By appropriately setting the texture parameter $\lambda_i$ in the texture model, the face textures A(x) for all the images can be reproduced. In addition, the average face image $A_0(x)$ and the texture vector $A_i(x)$ that are set in the texture model setting step (Step S140 in FIG. 2) are stored in the internal memory 120 as the AAM information AMI (FIG. 1).

By performing the above-described AAM setting process (FIG. 2), a shape model that models a face shape and a texture model that models a face texture are set. By combining the shape model and the texture model that have been set, that is, by performing transformation (an inverse transformation of the warp W shown in FIG. 7) from the average shape $s_0$ into a shape s for the synthesized texture A(x), the shapes and the textures of all the face images can be reproduced.

A3. Face Characteristic Position Specifying Process

Figure 9:
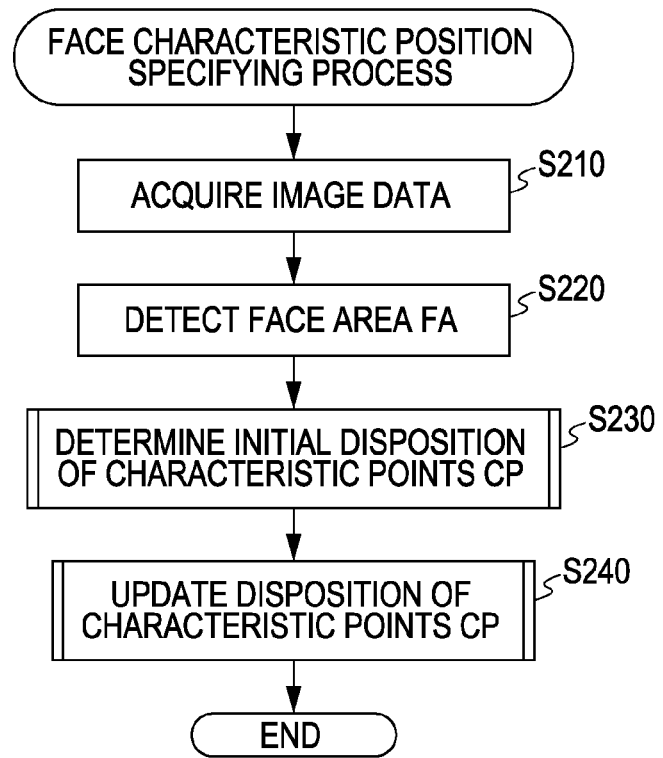
FIG. 9 is a flowchart showing the flow of a face characteristic position specifying process according to the first embodiment.

FIG. 9 is a flowchart showing the flow of the face characteristic position specifying process according to the first embodiment. The face characteristic position specifying process according to this embodiment is a process for specifying the positions of characteristic portions of a face included in a target image by determining the disposition of the characteristic points CP in the target image by using the AAM. As described above, in this embodiment, a total of 68 predetermined positions of a person's facial organs (the eyebrows, the eyes, the nose, and the mouth) and the contours of the face are set as the characteristic portions (see FIG. 4) in the AAM setting process (FIG. 2). Accordingly, in the face characteristic position specifying process according to this embodiment, the disposition of 68 characteristic points CP that represent predetermined positions of the person's facial organs and the contour of the face is determined.

When the disposition of the characteristic points CP in the target image is determined by performing the face characteristic position specifying process, the shapes and the positions of the facial organs of a person and the contour shape of the face that are included in a target image can be specified. Accordingly, the result of the face characteristic position specifying process can be used in image processing such as an expression determination process for detecting a face image having a specific expression (for example, a smiling face or a face with closed eyes), a face-turn direction determining process for detecting a face image positioned in a specific direction (for example, a direction turning to the right side or a direction turning to the lower side), or a face transformation process for transforming the shape of a face. In addition, the target image of which the disposition of the characteristic points CP is represented may be printed, or an image for which image processing has been performed based on the process result of the face characteristic position specifying process may be printed.

In Step S210 (FIG. 9), the image processing unit 200 (FIG. 1) acquires image data representing a target image that becomes a target for the face characteristic position specifying process. According to the printer 100 of this embodiment, when the memory card MC is inserted into the card slot 172, a thumbnail image of the image file that is stored in the memory card MC is displayed in the display unit 150. A user selects one or a plurality of images that become the processing target through the operation unit 140 while referring to the displayed thumbnail image. The image processing unit 200 acquires the image file that includes the image data corresponding to one or the plurality of images that has been selected from the memory card MC and stores the image file in a predetermined area of the internal memory 120. Here, the acquired image data is referred to as target image data, and an image represented by the target image data is referred to as a target image OI.

In Step S220 (FIG. 9), the face area detecting section 230 (FIG. 1) detects an image area that includes at least a part of a face image in the target image OI as a face area FA. The detecting of the face area FA can be performed by using a known face detecting technique. As the known face detecting technique, for example, there are a technique using pattern matching, a technique using extraction of a skin-color area, a technique using learning data that is set by learning (for example, learning using a neural network, learning using boosting, learning using a support vector machine, or the like) using sample face images, and the like.

Figure 10:
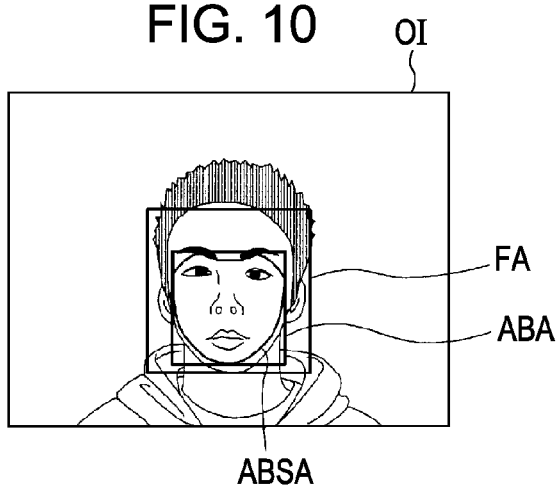
FIG. 10 is an explanatory diagram showing an example of the result of detecting a face area in a target face image.

FIG. 10 is an explanatory diagram showing an example of the result of detecting the face area FA in the target image OI. In FIG. 10, a face area FA that is detected from the target image OI is shown. In this embodiment, a face detecting technique for detecting a rectangle area that approximately includes from the forehead to the chin in the vertical direction of the face and approximately includes the outer sides of both the ears in the horizontal direction is detected as the face area FA is used.

In addition, an assumed reference area ABA shown in FIG. 10 is an area that is assumed to be in correspondence with the reference area BA (see FIG. 8) that is the entire area of the average face image $A_0(x)$. The assumed reference area ABA is set as an area, which has predetermined relationship with the face area FA for the size, the tilt, and the positions in the vertical direction and the horizontal direction, based on the detected face area FA. The predetermined relationship between the face area FA and the assumed reference area ABA is set in advance in consideration of the characteristics (the range of a face detected as the face area FA) of the face detecting technique used in detecting the face area FA such that the assumed reference area ABA corresponds to the reference area BA for a case where the face represented in the face area FA is an average face. In addition, within the assumed reference area ABA, an assumed average shape area ABSA is set. The assumed average shape area ABSA is an area assumed to be in correspondence with the average shape area BSA (see FIG. 8) of the average face image $A_0(x)$. The relationship between the assumed reference area ABA and the assumed average shape area ABSA is the same as that between the reference area BA and the average shape area BSA.

In addition, when any face area FA is not detected from the target image OI in Step S220 (FIG. 9), it is determined that a face image is not included in the target image OI. Accordingly, in such a case, the face characteristic position specifying process is completed, or the face area FA detecting process is performed again.

Figure 11:
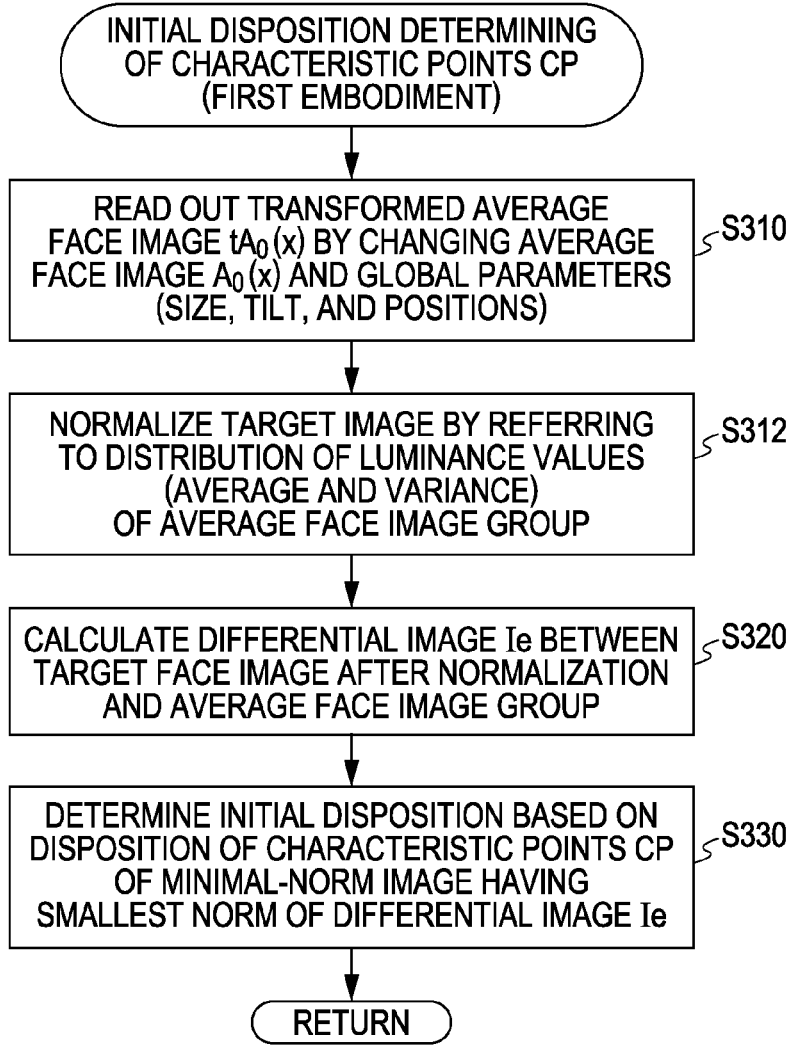
FIG. 11 is a flowchart showing the flow of an initial disposition determining process for characteristic points according to the first embodiment.

In Step S230 (FIG. 9), the face characteristic position specifying section 210 (FIG. 1) determines the initial disposition of the characteristic points CP in the target image OI. FIG. 11 is a flowchart showing the flow of an initial disposition determining process for the characteristic points CP according to the first embodiment. In this embodiment, a transformed average face image $tA_0(x)$ that is generated by transformation such as changing a global parameter of the above-described average face image $A_0(x)$ (see FIG. 8) is set in advance and is stored in the internal memory 120 together with the average face image $A_0(x)$ as the AAM information AMI (FIG. 1).

Figure 12A:
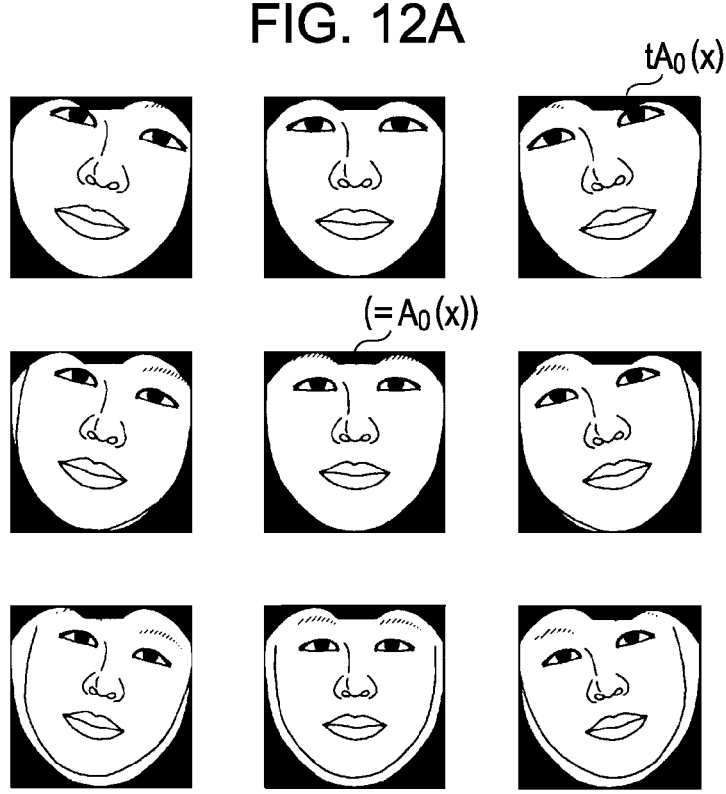
FIGS. 12A and 12B are explanatory diagrams showing an example of transformed average face images.
Figure 12B:
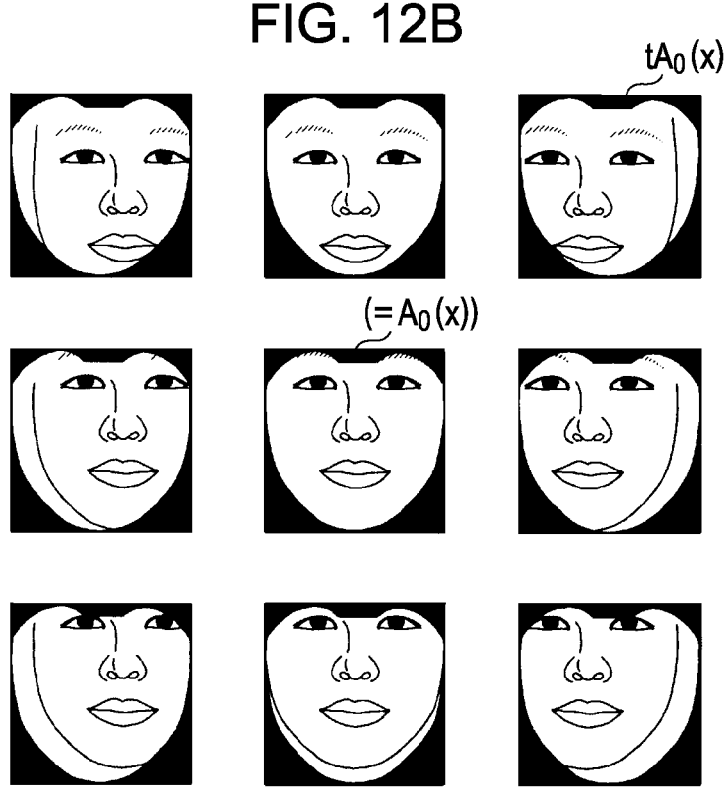

FIGS. 12A and 12B are explanatory diagrams showing an example of the transformed average face images $tA_0(x)$. The transformed average face image $tA_0(x)$ is an image acquired by performing transformation for changing at least one of the size, the tilt, and the positions (the positions in the upper and lower sides and the positions in the left and right sides) of the average face image $A_0(x)$ as global parameters. In particular, as shown in FIG. 12A, the transformed average face image $tA_0(x)$ includes an image (an image shown above or below the average face image $A_0(x)$) that is acquired by enlarging or reducing an image within the average shape area BSA (see FIG. 8) of the average face image $A_0(x)$, shown on the center, at a predetermined scaling factor and an image (an image shown on the left side or the right side of the average face image $A_0(x)$) that is acquired by changing the tilt of the image by a predetermined angle in the clockwise direction or the counterclockwise direction. In addition, the transformed average face image $tA_0(x)$ includes an image (an image shown on the upper left side, the lower left side, the upper right side, or the lower right side of the average face image $A_0(x)$) that is acquired by performing transformation that combines enlargement or reduction and a change in the tilt of the image within the average shape area BSA of the average face image $A_0(x)$. In addition, as shown in FIGS. 12A and 12B, the size of the transformed average face image $tA_0(x)$ is the same as that of the average face image $A_0(x)$. The transformed average face image $tA_0(x)$, similarly to the average face image $A_0(x)$, is configured by two areas including an average shape area BSA and a mask area MA (see FIG. 8). The shapes of the average shape area BSA and the mask area MA of the transformed average face image $tA_0(x)$ are the same as those of the average shape area BSA and the mask area MA of the average face image $A_0(x)$.

In addition, as shown in FIG. 12B, the transformed average face image $tA_0(x)$ includes an image (an image shown below or above the average face image $A_0(x)$) acquired by moving the image within the average shape area BSA (see FIG. 8) of the average face image $A_0(x)$ to the upper side or the lower side by a predetermined amount in a parallel manner or an image (an image shown on the right side or the left side of the average face image $A_0(x)$) acquired by moving the image within the average shape area BSA to the left side or the right side by a predetermined amount in a parallel manner. In addition, the transformed average face image $tA_0(x)$ includes an image (an image shown on the upper left side, the lower left side, the upper right side, or the lower right side of the average face image $A_0(x)$) acquired by performing transformation that combines parallel movement of the image within the average shape area BSA of the average face image $A_0(x)$ to the upper side or the lower side and parallel movement of the image within the average shape area BSA to the left side or the right side.

Furthermore, the transformed average face image $tA_0(x)$ includes images acquired by performing parallel movement to the upper side, the lower side, the left side, or the right side shown in FIG. 12B for eight transformed average face images $tA_0(x)$ shown in FIG. 12A. Accordingly, in this embodiment, by performing transformation of a total of 80 types (=3×3×3×3−1) corresponding to combinations of three levels for each of four global parameters (the size, the tilt, the positions in the upper and the lower sides, and the positions on the left and right sides) for the average face image $A_0(x)$, a total of 80 types of the transformed average face images $tA_0(x)$ are generated and set. The transformations of the total of 80 types correspond to second transformations of N types according to an embodiment of the invention. In addition, the transformed average face images $tA_0(x)$ of 80 types correspond to reference face images, for which the second transformations of N types are performed, according to an embodiment of the invention. In addition, the average face image $A_0(X)$ can be regarded as an image that is acquired by performing a transformation, of which the adjust amount is zero for all the four global parameters, for the average face image $A_0(x)$. In such a case, it can be represented that a total of 81 types of the transformed average face images $tA_0(x)$ are set by performing transformations of a total of 81 types (=3×3×3×3).

In addition, the disposition of the characteristic points CP in the transformed average face image $tA_0(x)$ is uniquely determined by the transformation that is performed for the average face image $A_0(x)$ for generating the transformed average face image $tA_0(x)$. The information representing the disposition of the characteristic points CP in each transformed average face image $tA_0(x)$ is stored in the internal memory 120 as the AAM information AMI (FIG. 1).

Here, an image group (an image group constituted by images of 81 types) that is configured by the average face image $A_0(x)$ and the transformed average face images $tA_0(x)$ will be referred to as an "average face image group". Each of the average face image group is in correspondence with the assumed reference area ABA (FIG. 10) of the target image OI in a differential image Ie calculating step (Step S320 shown in FIG. 11) to be described later. Relating to this correspondence, the correspondence relationship between the average face image $A_0(x)$ and the assumed reference area ABA of the target image OI will be referred to as "reference correspondence relationship. At this moment, the correspondence relationship between each transformed average face image $tA_0(x)$ and the assumed reference area ABA of the target image OI corresponds to the correspondence relationship (hereinafter, also referred to as "transformed correspondence relationship") between the average face image $A_0(x)$ and the assumed reference area ABA of the target image OI after the above-described transformations of a total of 80 types are performed for either the average face image $A_0(x)$ or the assumed reference area ABA of the target image OI with respect to the reference correspondence relationship used as a reference.

In Step S310 of the initial disposition determining process for the characteristic points CP (FIG. 11), the initial disposition portion 211 (FIG. 1) reads out the average face image $A_0(x)$ and the transformed average face image $tA_0(x)$ that are stored as the AAM information AMI.

In Step S312 (FIG. 11), the normalization portion 215 (FIG. 1) normalizes the target image OI by referring to an index value that represents the distribution of luminance values of each average face image group. In this embodiment, information that represents an average value and a variance value as index values representing the distribution of the luminance values in the average shape area BSA (see FIG. 8) for each average face image group is included in the AAM information AMI. The normalization portion 215 calculates the average value and the variance value of luminance values in the assumed average shape area ABSA (see FIG. 10) of the target image OI. Then, the normalization portion 215 performs an image transformation (normalization process) for the assumed average shape area ABSA of the target image OI, so that the average value and the variance value, which are calculated, are identical to those of luminance values of each average face image group. Since the average face image group is constituted by images (the average face image $A_0(x)$ and the transformed average face images $tA_0(x)$ of 80 types) of 81 types, the number of times of performing the image transformation 81. The average value and the variance value of luminance values correspond to a predetermined first index value, which represents the distribution of pixel values, according to an embodiment of the invention. In addition, this image transformation (normalization process) corresponds to a second normalization process according to an embodiment of the invention. This second normalization process can be represented to be performed for each transformed correspondence relationship between the above-described reference correspondence relationship and the transformed correspondence relationships of the 80 types.

In Step S320 (FIG. 11), the initial disposition portion 211 (FIG. 1) calculates a differential image Ie between the assumed average shape area ABSA (see FIG. 10) of the target image OI and each average shape area BSA (see FIG. 8) of the average face image group. The calculation of the differential image Ie is performed for a combination of each image that constitutes the average face image group and the target image OI that is normalized by referring to the distribution of luminance values of the image. Since the number of the images that constitute the average face image group (the average face image $A_0(x)$ and the transformed average face images $tA_0(x)$) are 81, the initial disposition portion 211 calculates 81 differential images Ie.

In Step S330 (FIG. 11), the initial disposition portion 211 (FIG. 1) calculates the norms of each differential image Ie. Then, the initial disposition portion 211 selects an image (hereinafter, also referred to as a "minimal-norm image") corresponding to the differential image Ie having the smallest value of the norm from the average face image group (the average face image $A_0(x)$ and the transformed average face images $tA_0(x)$), and determines the initial disposition of the characteristic points CP in the target image OI based on the disposition of the characteristic points CP in the minimal-norm image. The minimal-norm image is an image having a smallest difference (the closest or the most similar) between the average shape area BSA thereof and the assumed average shape area ABSA (FIG. 10) of the target image OI. In addition, the selection of the minimal-norm image is a parallel expression of selecting a correspondence relationship that has a smallest difference between the average face image group (the average shape area BSA thereof) and the target image OI (the assumed average shape area ABSA thereof) after the normalization process from among the above-described reference correspondence relationship and the transformed correspondence relationship of 80 types and selecting the average face image $A_0(x)$ or the transformed average face image $tA_0(x)$ in the selected correspondence relationship. The initial disposition portion 211 determines the disposition of the characteristic points CP in the minimal-norm image in the case where the minimal-norm image is overlapped in the assumed reference area ABA of the target image OI as the initial disposition of the characteristic points CP in the target image OI. By performing the initial disposition process for the characteristic points CP, approximate values of the global parameters, which define the size, the tilt, and the positions (the overall position in the vertical direction and the position in the horizontal direction) of the disposition of the characteristic points CP of the target image OI, are set.

Figure 13:
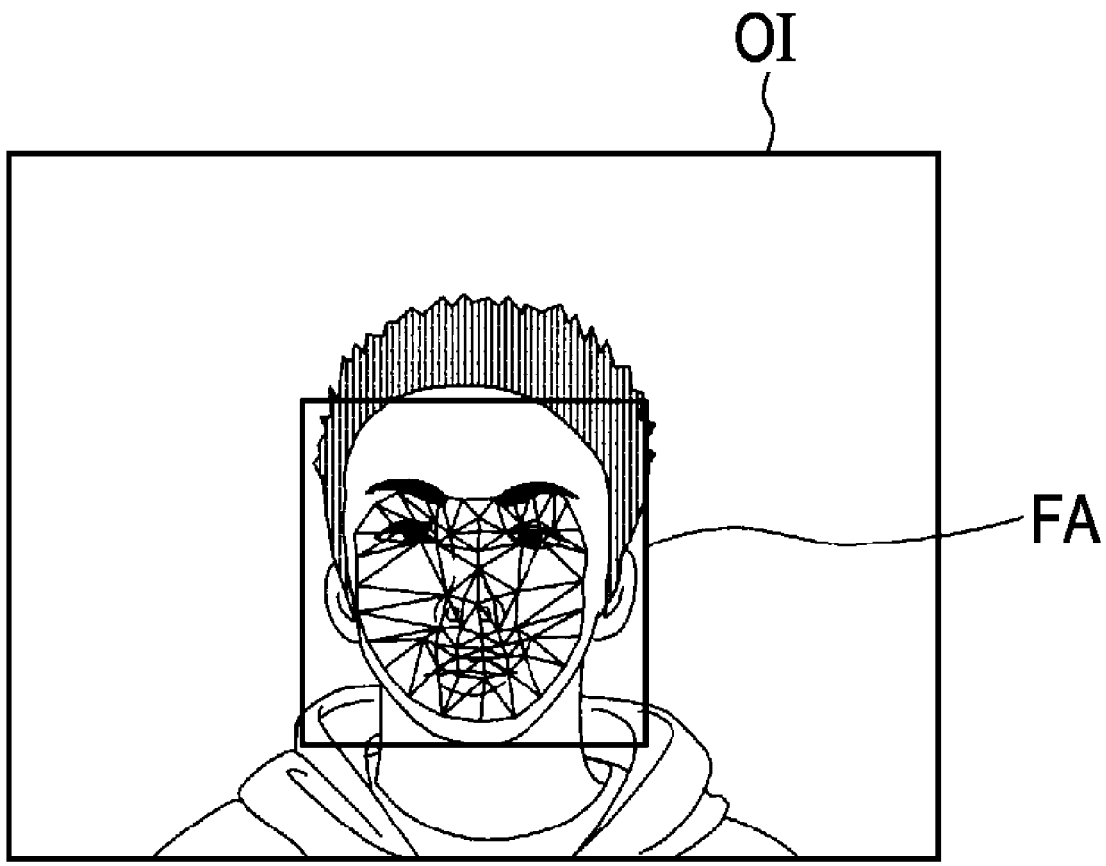
FIG. 13 is an explanatory diagram showing an example of an initial disposition of characteristic points in a target face image.

FIG. 13 is an explanatory diagram showing an example of the initial disposition of the characteristic points CP in the target image OI. In FIG. 13, the initial disposition of the characteristic points CP determined for the target image OI is represented by meshes. In other words, intersections of the meshes are the characteristic points CP. This mesh is in the scaling relationship with the average shape mesh BSM of the average shape $s_0$.

Figure 14:
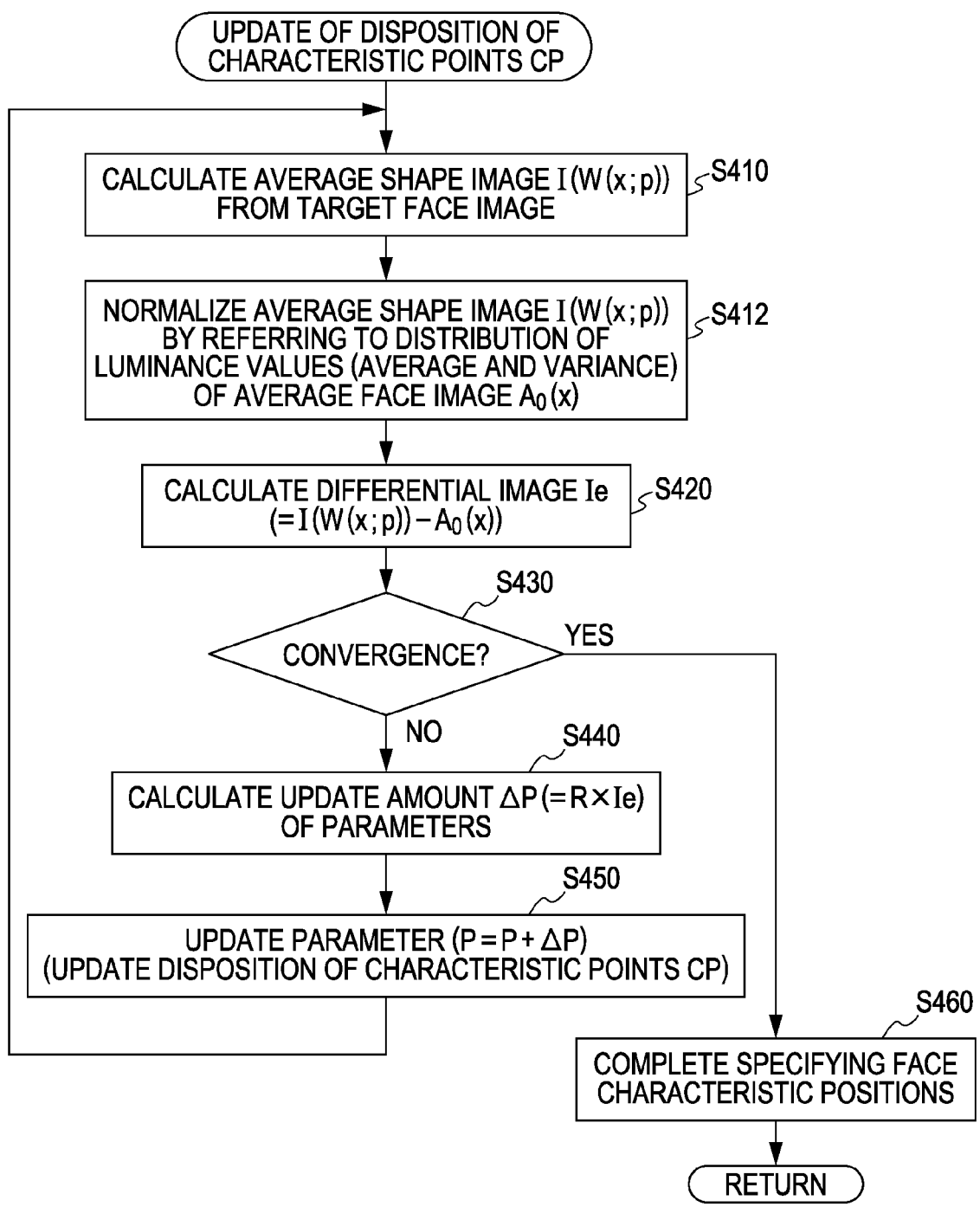
FIG. 14 is a flowchart showing the flow of an update process for the disposition of characteristic points according to the first embodiment.

When the initial disposition determining process (Step S230 shown in FIG. 9) for the characteristic points CP is completed, the face characteristic position specifying section 210 (FIG. 1) updates the characteristic points CP of the target image OI (Step S240). FIG. 14 is a flowchart showing the flow of an update process for the disposition of the characteristic points CP according to the first embodiment.

In Step S410, the image transforming portion 212 (FIG. 1) acquires an average shape image $I(W(x;p))$ from the target image OI. The average shape image $I(W(x;p))$ is a face image having the average shape $s_0$. The average shape image $I(W(x;p))$ is calculated by performing a transformation in which the disposition of the characteristic points CP of an input image is identical to the disposition (see FIGS. 6A and 6B) of the characteristic points CP of the average shape $s_0$.

The transformation for acquiring the average shape image $I(W(x;p))$, similarly to the transformation (see FIG. 7) for acquiring the sample face image SIw, is performed by a warp W that is an affine transformation set for each triangle area TA. In particular, the average shape image $I(W(x;p))$ is acquired by specifying the average shape area BSA (an area surrounded by the characteristic points CP that are located on the outer periphery) of the target image OI by the characteristic points CP (see FIG. 13) disposed on the target image OI and performing the affine transformation for each triangle area TA of the average shape area BSA. In this embodiment, the average shape image $I(W(x;p))$, similarly to the average face image $A_0(x)$, is configured by an average shape area BSA and a mask area MA and is acquired as an image having the same size as that of the average face image $A_0(x)$. The transformation for calculating the average shape image $I(W(x;p))$ corresponds to a first transformation according to an embodiment of the invention. In addition, the average shape image $I(W(x;p))$ corresponds to a target image OI (the average shape area BSA thereof) for which the first transformation has been performed.

In addition, as described above, a pixel group x is a set of pixels located in the average shape area BSA of the average shape $s_0$. The pixel group of an image (the average shape area BSA of the target image OI), for which the warp W has not been performed, corresponding to the pixel group x of an image (a face image having the average shape $s_0$) for which the warp W has been performed is denoted as $W(x;p)$. The average shape image is an image that is configured by luminance values for each pixel group $W(x;p)$ in the average shape area BSA of the target image OI. Thus, the average shape image is denoted by $I(W(x;p))$.

In Step S412 (FIG. 14), the normalization portion 215 (FIG. 1) normalizes the average shape image $I(W(x;p))$ by referring to the index value that represents the distribution of luminance values of the average face image $A_0(x)$. As described above, in this embodiment, information that represents the average value and the variance value as the index values representing the distribution of luminance values of the average shape area BSA (see FIG. 8) of the average face image $A_0(x)$ is included in the AAM information AMI. The normalization portion 215 calculates the average value and the variance value of luminance values of the average shape area BSA of the average shape image $I(W(x;p))$, and performs an image transformation (normalization process) for the average shape area BSA of the average shape image $I(W(x;p))$, so that the average value and the variance value, which have been calculated, are identical to those of average face image $A_0(x)$. The average value and the variance value of luminance values correspond to a predetermined first index value that represents the distribution of pixel values according to an embodiment of the invention. In addition, the above-described image transformation (normalization process) corresponds to a first normalization process according to an embodiment of the invention.

In Step S420 (FIG. 14), the face characteristic position specifying section 210 (FIG. 1) calculates a differential image Ie between the average shape image $I(W(x;p))$ and the average face image $A_0(x)$. In Step S430, the determination portion 213 (FIG. 1) determines whether the disposition update process for the characteristic points CP converges based on the differential image Ie. The determination portion 213 calculates a norm of the differential image Ie. Then, in a case where the value of the norm is smaller than a threshold value set in advance, the determination portion 213 determines convergence. On the other hand, in a case where the value of the norm is equal to or larger than the threshold value, the determination portion 213 determines no convergence. The norm of the differential image Ie is an index value that represents the degree of difference between the average shape image $I(W(x;p))$ and the average face image $A_0(x)$ and corresponds to a second index value according to an embodiment of the invention.

In addition, in the convergence determination of Step S430, the determination portion 213 may be configured to determine convergence for a case where the value of the norm of the calculated differential image Ie is smaller than a value calculated in Step S430 at the previous time and determine no convergence for a case where the value of the norm of the calculated differential image Ie is equal to or larger than the previous value. Alternatively, the determination portion 213 may be configured to determine convergence by combining the determination made based on the threshold value and the determination made based on the previous value. For example, the determination portion 213 may be configured to determine convergence only for case where the value of the calculated norm is smaller than the threshold value and is smaller than the previous value and determine no convergence for other cases.

When no convergence is determined in the conversion determination of Step S430, the update portion 214 (FIG. 1) calculates the update amount ΔP of the parameters (Step S440). The update amount ΔP of the parameter represents the amount of change in the values of the four global parameters (the overall size, the tilt, the X-direction position, and the Y-direction position) and n shape parameters $p_i$ (see Equation (1)). In addition, right after the initial disposition of the characteristic points CP, the global parameters are set to values determined in the initial disposition determining process (FIG. 11) for the characteristic points CP. In addition, a difference between the initial disposition of the characteristic points CP and the characteristic points CP of the average shape $s_0$ is limited to differences in the overall size, the tilt, and the positions. Accordingly, all the values of the shape parameters $p_i$ of the shape model are zero.

The update amount ΔP of the parameters is calculated by using the following Equation (3). In other words, the update amount ΔP of the parameters is product of an update matrix R and the difference image Ie.

$$\Delta P = R \times Ie \quad \text{Equation (3)}$$

The update matrix R represented in Equation (3) is a matrix of M rows×N columns that is set by learning in advance for calculating the update amount ΔP of the parameters based on the differential image Ie and is stored in the internal memory 120 as the AAM information AMI (FIG. 1). In this embodiment, the number M of the rows of the update matrix R is identical to a sum (4+n) of the number (4) of the global parameters and the number (n) of the shape parameters $p_i$, and the number N of the columns is identical to the number (56 pixels×56 pixels-number of pixels included in the mask area MA) within the average shape area BSA of the average face image $A_0(x)$ (FIGS. 6A and 6B). The update matrix R is calculated by using the following Equations (4) and (5).

Equation (4)

$$R = H^{-1} \sum \left[ \nabla A_0 \frac{\partial W}{\partial P} \right]^T \quad (4)$$

Equation (5)

$$H = \sum \left[ \nabla A_0 \frac{\partial W}{\partial P} \right]^T \left[ \nabla A_0 \frac{\partial W}{\partial P} \right] \quad (5)$$

In Step S450 (FIG. 14), the update portion 214 (FIG. 1) updates the parameters (four global parameters and n shape parameters $p_i$) based on the calculated update amount ΔP of the parameters. Accordingly, the disposition of the characteristic points CP of the target image OI is updated. After update of the parameters is performed in Step S450, again, the average shape image I(W(x;p)) is calculated from the target image OI for which the disposition of the characteristic points CP has been updated (Step S410), the differential image Ie is calculated (Step S420), and a convergence determination is made based on the differential image Ie (Step S430). In a case where no convergence is determined in the convergence determination performed again, additionally, the update amount ΔP of the parameters is calculated based on the differential image Ie (Step S440), and disposition update of the characteristic points CP by updating the parameters is performed (Step S450).

When the process from Step S410 to Step S450 shown in FIG. 14 is repeatedly performed, the positions of the characteristic points CP corresponding to the characteristic portions of the target image OI approach the positions (correct positions) of actual characteristic portions as a whole. Then, the convergence is determined in the convergence determination (Step S430) at a time point. When the convergence is determined in the convergence determination, the face characteristic position specifying process is completed (Step S460).

The disposition of the characteristic points CP specified by the values of the global parameters and the shape parameters $p_i$ that are set at that moment is determined to be the final disposition of the characteristic points CP of the target image OI.

Figure 15:
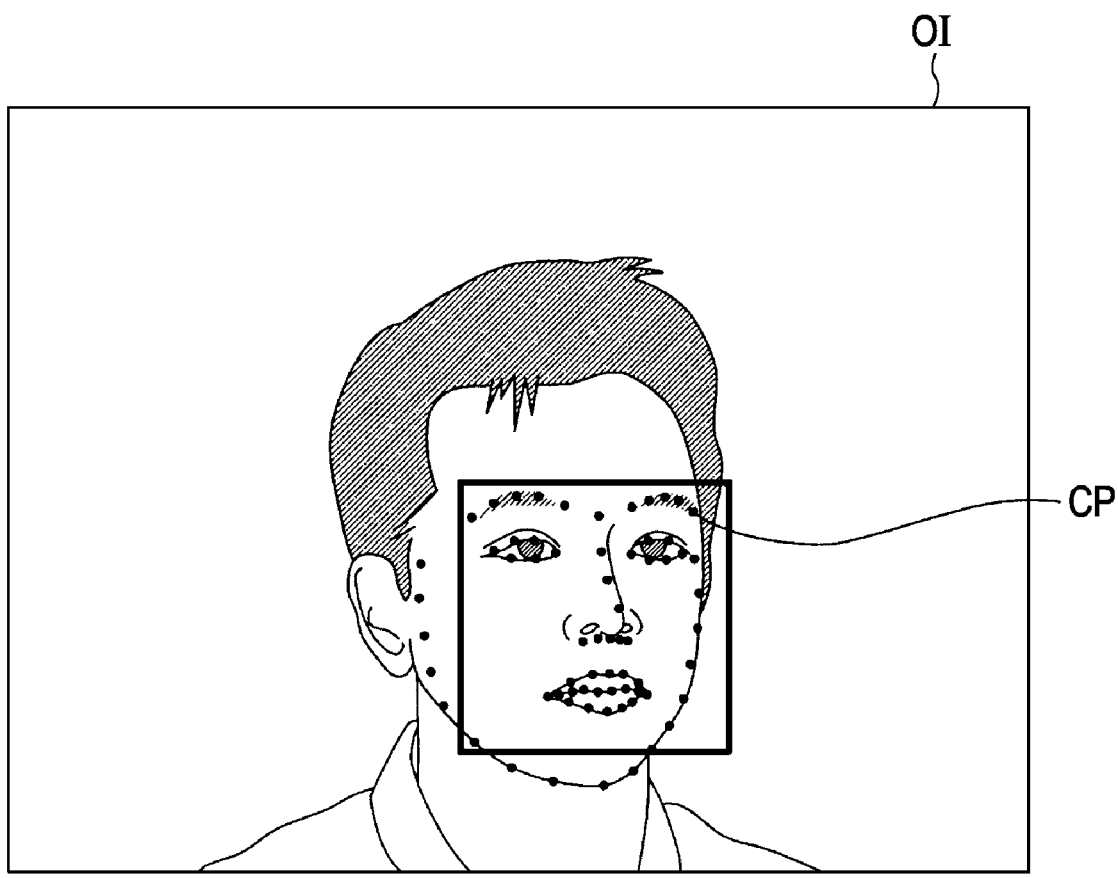
FIG. 15 is an explanatory diagram showing an example of the result of a face characteristic position specifying process.

FIG. 15 is an explanatory diagram showing an example of the result of the face characteristic position specifying process. In FIG. 15, the disposition of the characteristic points CP that is finally determined for the target image OI is shown. By disposing the characteristic points CP, the positions of the characteristic portions (person's facial organs (the eyebrows, the eyes, the nose, and the mouth) and predetermined positions in the contour of a face) of the target image OI are specified. Accordingly, the shapes and the positions of the person's facial organs and the contour and the shape of the face of the target image OI can be specified.

As described above, in the face characteristic position specifying process (FIG. 9) according to this embodiment, an image that is the most similar to the assumed reference area ABA (FIG. 10) of the target image OI is selected from among the average face image $A_0(x)$ and the transformed average face images $tA_0(x)$. Then, the initial disposition of the characteristic points CP of the target image OI is determined based on the disposition of the characteristic points CP of the average face image $A_0(x)$ or the transformed average face image $tA_0(x)$ that has been selected. Thereafter, the disposition of the characteristic points CP in the target image OI is updated based on the result of comparing the average shape image I(W(x;p)) calculated from the target image OI with the average face image $A_0(x)$. In other words, in the initial disposition determining process (FIG. 11) for the characteristic points CP, the approximate values of global parameters that define the overall size, the tilt, the positions (the position in the vertical direction and the position in the horizontal direction) of the disposition of the characteristic points CP are determined. Then, in the update process (FIG. 14) for the disposition of characteristic points CP performed thereafter, the disposition of the characteristic points CP is updated in accordance with the update of the parameters performed based on the differential image Ie, and the final disposition of the characteristic points CP in the target image OI is determined. As described above, according to this embodiment, by determining the approximate values of the global parameters that have a large variance (large dispersion) in the overall disposition of the characteristic points CP in the initial disposition determining process, first, the efficiency, the processing speed, and the accuracy of the face characteristic position specifying process can be improved (final determination on the disposition of the characteristic points CP not on the basis of a so-called local optimized solution but on the basis of a global optimized solution).

In addition, in the update process (FIG. 14) for the disposition of the characteristic points CP according to this embodiment, before a differential image Ie between the average shape image I(W(x;p)) calculated from the target image OI and the average face image $A_0(x)$ is calculated (Step S420 shown in FIG. 14), the image transformation (normalization process) is performed for the average shape image I(W(x;p)), so that the average values and the variance values of luminance values of the average shape area BSA of the average shape image I(W(x;p)) and the average shape area BSA of the average face image $A_0(x)$ are identical to each other (Step S412). Accordingly, the influence of the characteristics of the distribution of luminance values of the individual target images OI on the differential image Ie is suppressed, whereby the accuracy of the convergence determination (Step S430) on the basis of the differential image Ie is improved. Furthermore, the accuracy of the face characteristic position specifying process is improved. In addition, in the convergence determination, as described above, high-precision determination can be performed by using an absolute threshold value. Accordingly, the processing speed can be improved, for example, compared to a case where the convergence determination is performed by comparing the value of the norm of the differential image Ie with that of the previous time.

In addition, similarly, in the initial disposition determining process (FIG. 11) for the characteristic points CP according to this embodiment, before a differential image Ie between the target image OI and the average face image is calculated (Step S320 shown in FIG. 11), the image transformation (normalization process) is performed for the target image OI, so that the average values and the variance values of luminance values of the assumed average shape area ABSA of the target image OI and each average shape area BSA of the average face image group are identical to each other (Step S312). Accordingly, the influence of the characteristics of the distribution of luminance values of the individual target images OI on the differential image Ie is suppressed, whereby the accuracy of the initial disposition determining for the characteristic points CP, which is based on the differential image Ie, is improved. Therefore, the precision and the processing speed of the face characteristic position specifying process can be improved.

B. Second Embodiment

Figure 16:
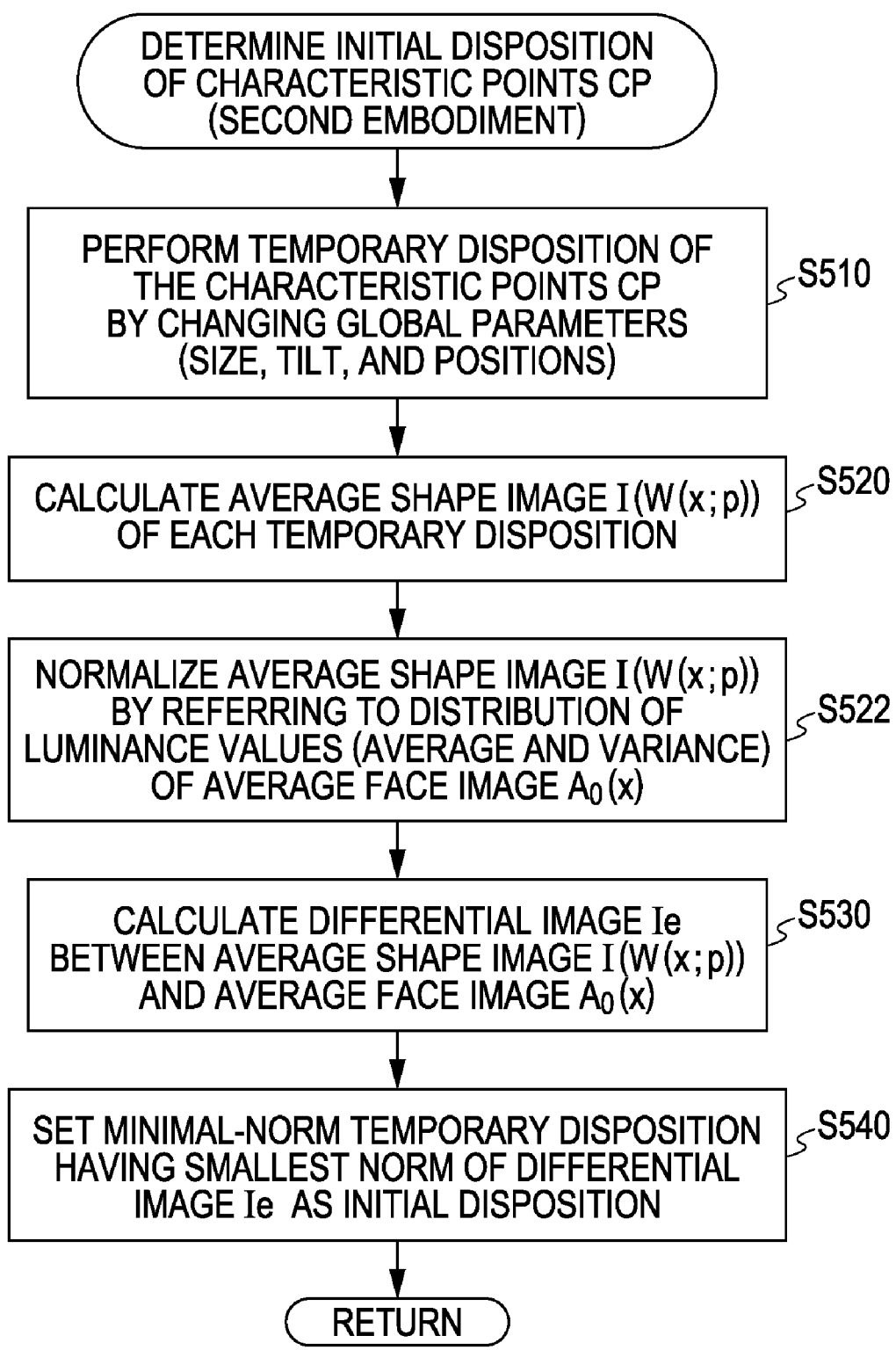
FIG. 16 is a flowchart showing the flow of an initial disposition determining process for characteristic points according to a second embodiment of the invention.

FIG. 16 is a flowchart showing the flow of the initial disposition determining process for the characteristic points CP in a second embodiment of the invention. In Step S510, the initial disposition portion 211 (FIG. 1) sets a temporary disposition of the characteristic points CP on the target image OI by variously changing the values of the size, the tilt, the positions (the positions located on the upper and lower sides and the positions located on the left and right sides) as the global parameters.

Figure 17A:
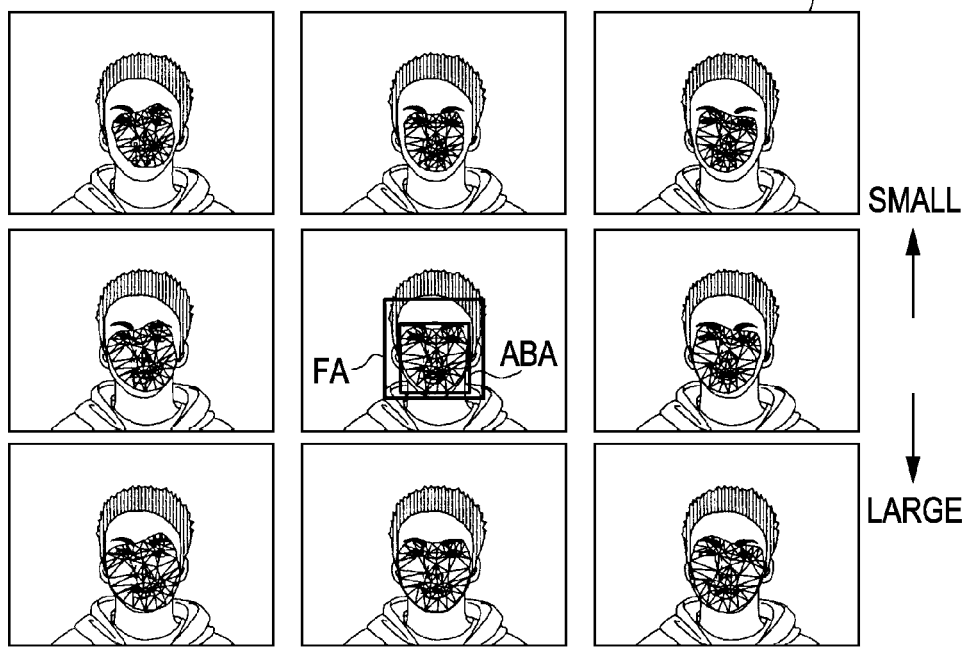
FIGS. 17A and 17B are explanatory diagrams showing an example of temporary disposition of characteristic points in a target face image.
Figure 17B:
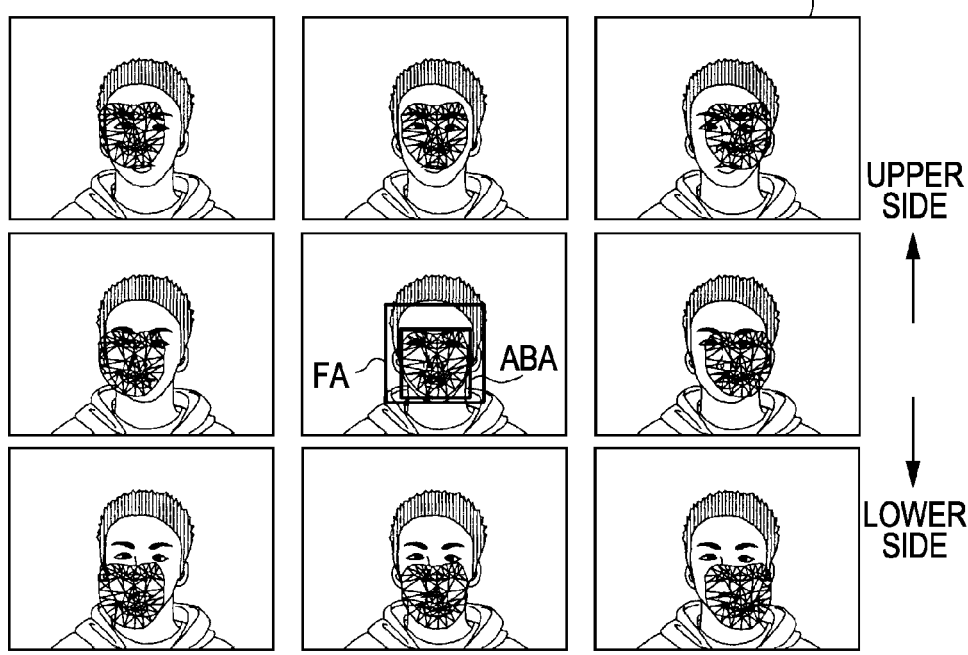

FIGS. 17A and 17B are explanatory diagrams showing an example of temporary disposition of the characteristic points CP in the target image OI. In FIGS. 17A and 17B, the temporary disposition of the characteristic points CP in the target image OI is represented by meshes. In other words, intersections of the meshes are the characteristic points CP. The initial disposition portion 211, as shown in FIGS. 17A and 17B also the center, sets the temporary disposition (hereinafter, also referred to as "reference temporary disposition") specified by the characteristic points CP of the average face image $A_0(x)$ for a case where the average face image $A_0(x)$ (FIG. 8) is overlapped with the assumed reference area ABA (see FIG. 10) of the target image OI.

The initial disposition portion 211 sets temporary disposition by variously changing the values of the global parameters for the reference temporary disposition. The changing of the global parameters (the size, the tile, the position in the vertical direction, and the position in the horizontal direction) corresponds to performing enlargement or reduction, a change in the tilt, and parallel movement of the meshes that specify the temporary disposition of the characteristic points CP. Accordingly, the initial disposition portion 211, as shown in FIG. 17A, sets temporary disposition (shown below or above the reference temporary disposition) specified by meshes acquired by enlarging or reducing the meshes of the reference temporary disposition at a predetermined scaling factor and temporary disposition (shown on the right side or the left side of the reference temporary disposition) that is specified by meshes acquired by changing the tilt of the meshes of the reference temporary disposition by a predetermined angle in the clockwise direction or the counterclockwise direction. In addition, the initial disposition portion 211 also sets temporary dispositions (shown on the upper left side, the lower left side, the upper right side, and the lower right side of the reference temporary disposition) specified by meshes acquired by performing a transformation combining enlargement or reduction and a change in the tilt of the meshes of the reference temporary disposition.

In addition, as shown in FIG. 12B, the initial disposition portion 211 sets temporary disposition (shown above or below the reference temporary disposition) that is specified by meshes acquired by performing parallel movement of the meshes of the reference temporary disposition by a predetermined amount to the upper side or the lower side and temporary disposition (shown on the left side and the right side of the reference temporary disposition) that is specified by meshes acquired by performing parallel movement to the left or right side for the meshes of the reference temporary disposition. In addition, the initial disposition portion 211 sets temporary disposition (shown on the upper left side, the lower left side, the upper right side, and the lower right side of the reference temporary disposition) that is specified by meshes acquired by performing the transformation combining the parallel movement to the upper or lower side and the parallel movement to the left or right side for the meshes of the reference temporary disposition.

In addition, the initial disposition portion 211 also sets temporary disposition that is specified by meshes, shown in FIG. 17B, acquired by performing parallel movement to the upper or lower side and to the left or right side for the meshes of eight temporary dispositions other than the reference temporary disposition shown in FIG. 17A. Accordingly, in the second embodiment, a total of 81 types of the temporary dispositions including the reference temporary disposition and 80 types of temporary dispositions that are set by performing 80 (=3×3×3×3−1) types of transformations corresponding to combinations of three-level values of four global parameters (the size, the tilt, and the position located on the upper and lower sides, and the position located on the left and right sides) for meshes of the reference temporary disposition are set.

In this embodiment, the correspondence relationship between the average face image $A_0(X)$ and the assumed reference area ABA of the target image OI in the reference temporary disposition will be referred to as a "reference correspondence relationship". The setting of the temporary disposition can be described to be implemented by setting a correspondence relationship (hereinafter, also referred to as a "transformed correspondence relationship") between the average face image $A_0(x)$ and the target image OI after the above-described transformations of 80 types are performed for either the average face image $A_0(x)$ or the target image OI by using the reference correspondence relationship as a reference and setting the disposition of the characteristic points CP of the average face image $A_0(x)$ in the reference correspondence relationship and the transformed correspondence relationships as the temporary disposition of the characteristic points CP of the target image OI. The transformations of a total of 80 types correspond to second transformations of N types according to an embodiment of the invention.

Figure 18:
FIG. 18 is an explanatory diagram showing an example of average shape images.

In Step S520 (FIG. 16), the image transforming portion 212 (FIG. 1) calculates the average shape image $I(W(x;p))$ corresponding to each temporary disposition that has been set. FIG. 18 is an explanatory diagram showing an example of the average shape images $I(W(x;p))$. The method of calculating the average shape image $I(W(x;p))$ is the same as the method of calculating the average shape image $I(W(x;p))$ (Step S410) used in the characteristic point CP disposition updating process (FIG. 14) according to the above-described first embodiment. In other words, the average shape image I(W(x;p)) is acquired by specifying the average shape area BSA (an area surrounded by characteristic points CP that are located on the outer periphery) by performing temporal disposition of the characteristic points CP in the target image OI and performing an affine transformation for each triangle area TA of the average shape area BSA of the target image OI. The average shape image I(W(x;p)), similarly to the average face image $A_0(x)$, is configured by an average shape area BSA and a mask area MA and is calculated as an image having the same size as that of the average face image $A_0(x)$. In FIG. 18, nine average shape images I(W(x;p)) corresponding to nine temporary dispositions shown in FIG. 17A are shown.

In Step S522 (FIG. 16), the normalization portion 215 (FIG. 1) normalizes the average shape images I(W(x;p)) by referring to the index value that represents the distribution of luminance values of the average face image $A_0(x)$. Also in the second embodiment, information that represents the average value and the variance value as the index values representing the distribution of the luminance values of the average shape area BSA (see FIG. 8) of the average face image $A_0(x)$ is included in the AAM information AMI. The normalization portion 215 calculates the average value and the variance value of luminance values of the average shape area BSA of each average shape image I(W(x;p)), and performs an image transformation (normalization process), so that the average value and the variance value that have been calculated are identical to those of luminance values of the average face image $A_0(x)$. The average value and the variance value of luminance values correspond to predetermined first index values representing the distribution of pixel values according to an embodiment of the invention. In addition, the image transformation (normalization process) corresponds to a first normalization process according to an embodiment of the invention.

In Step S530 (FIG. 16), the initial disposition portion 211 (FIG. 1) calculates a differential image Ie between each average shape image I(W(x;p)) and the average face image $A_0(x)$ after the normalization process. Here, 81 types of the temporary dispositions of the characteristic points CP are set, and 81 average shape images I(W(x;p)) are set. Accordingly, the initial disposition portion 211 calculates 81 differential images Ie.

In Step S540 (FIG. 16), the initial disposition portion 211 (FIG. 1) calculates norms of the differential images Ie and sets a temporary disposition (hereinafter, also referred to as a "minimal-norm temporary disposition") corresponding to the differential image Ie having the smallest value of the norm as the initial disposition of the characteristic points CP of the target image OI. The minimal-norm temporary disposition is a temporary disposition corresponding to the average shape image I(W(x;p) having the smallest (the closest or the most similar) degree of difference from the average face image $A_0(x)$. In addition, the selection of the minimal-norm temporary disposition is a parallel expression of selecting the correspondence relationship having the smallest difference between the average shape image I(W(x;p)) and the average face image $A_0(x)$ after the normalization process from among the reference correspondence relationship and the transformed correspondence relationships of 80 types that have been described above and selecting the temporary disposition in the selected correspondence relationship. By performing the initial disposition process for the characteristic points CP, approximate values of the global parameters, which define the overall size, the tilt, and the positions (the positions in the vertical direction and the position in the vertical direction) of the disposition of the characteristic points CP of the target image OI, are set.

As described above, also in the initial disposition determining process (FIG. 16) for the characteristic points CP according to the second embodiment, before a differential image Ie between the average shape image I(W(x;p)) calculated from the target image OI and the average face image $A_0(x)$ is calculated (Step S530 shown in FIG. 16), the image transformation (normalization process) is performed for the average shape image I(W(x;p)), so that the average values and the variance values of luminance values of the average shape area BSA of the average shape image I(W(x;p)) and the average shape area BSA of the average face image $A_0(x)$ are identical to each other (Step S522). Accordingly, the influence of the characteristics of the distribution of luminance values of the individual target images OI on the differential image Ie is suppressed, whereby the accuracy of the initial disposition determining for the characteristic points CP on the basis of the differential image Ie is improved. Accordingly, the accuracy and the processing speed of the face characteristic point specifying process can be improved.

C. Modified Examples

Furthermore, the invention is not limited to the above-described embodiments or examples. Thus, various embodiments can be performed without departing from the scope of the base idea of the invention. For example, the following modifications can be made.

C1. Modified Example 1

In each of the above-described embodiments, before the calculation (Step S420 shown in FIG. 14) of the differential image Ie in the update process (FIG. 14) for the disposition of characteristic points CP, the normalization process (Step S412 shown in FIG. 14) for the average shape image I(W(x; p)) is performed. In addition, also before the calculation (Step S320 shown in FIG. 11 or Step S530 shown in FIG. 16) of the differential image Ie in the initial disposition determining process (FIGS. 11 and 16) for characteristic portions CP, the normalization process (Step S312 shown in FIG. 11 or Step S522 shown in FIG. 16) for the target image OI or the average shape image I(W(x;p)) is performed. However, the normalization process may be configured to be performed in either the update process for the disposition of the characteristic points CP or the initial disposition determining process for characteristic points CP.

In addition, in the update process (FIG. 14) for the disposition of characteristic points CP, the normalization process is performed for the average shape image I(W(x;p)). However, as long as the normalization process is a process allowing the average value and the variance value of luminance values of the average shape image I(W(x;p)) to be identical to those of the average face image $A_0(x)$, the normalization process may be configured to be performed for the average face image $A_0(x)$ or to be performed for both the average shape image I(W(x;p)) and the average face image $A_0(x)$.

Similarly, in the initial disposition determining process (FIG. 11) for characteristic points CP according to the first embodiment, the normalization process is performed for the target image OI. However, as long as the normalization process is a process allowing the average value and the variance value of luminance values of the assumed average shape area ABSA of the target image OI to be identical to those of the average shape area BSA of the average face image group, the normalization process may be configured to be performed for the average face image group or to be performed for both the target image OI and the average face image group. In addition, in the initial disposition determining process (FIG. 16)

for characteristic points CP according to the second embodiment, the normalization process is performed for the average shape image I(W(x;p)). However, as long as the normalization process is a process allowing the average value and the variance value of luminance values of the average shape image I(W(x;p)) to be identical to those of the average face image $A_0(x)$, the normalization process may be configured to be performed for the average face image $A_0(x)$ or to be performed for both the average shape image I(W(x;p)) and the average face image $A_0(x)$.

In addition, in the update process (FIG. 14) for the disposition of characteristic points CP and the initial disposition determining process (FIGS. 11 and 16) for characteristic points CP according to each of the above-described embodiments, the normalization process is performed for allowing the average values and the variance values of two images to be identical to each other. However, the normalization process may be configured to be performed so as to allow the average values and the variance values of the two images not to be identical to each other but to be close to each other.

In addition, in the update process (FIG. 14) for the disposition of characteristic points CP and the initial disposition determining process (FIGS. 11 and 16) for characteristic points CP according to each of the above-described embodiments, the average value and the variance value of luminance values are used as the index values that represent the distribution of pixel values of an image. However, other index values such as a standard deviation of the luminance values or an average value and a variance value of RGB values may be used.

C2. Modified Example 2

In each of the above-described embodiments, in the initial disposition determining process (Step S230 shown in FIG. 9) for characteristic points CP, a differential image Ie between the average face image group and each target image OI or a differential image Ie between the average face image $A_0(x)$ and each of the plurality of average shape images I(W(x;p)) is calculated, and approximate values of the global parameters having great variances (large dispersion) of the entire disposition of the characteristic points CP are determined based on the differential image Ie. However, when the initial disposition of the characteristic points CP of the target image OI is determined, the calculating of the differential image Ie or the determining of the approximate values of the global parameters does not necessarily need to be performed. Thus, a disposition (for example, a disposition in the above-described reference correspondence relationship) that is predetermined may be configured to be determined as the initial disposition.

C3. Modified Example 3

In each of the above-described embodiments, as the determination index value used in the convergence determination (Step S430) of the update process (FIG. 14) for the disposition of characteristic points CP, the norm of the differential image Ie between the average shape image I(W(x;p)) and the average face image $A_0(x)$ is used. However, any other index value that represents the degree of difference between the average shape image I(W(x;p)) and the average face image $A_0(x)$ may be used as the determination index value.

C4. Modified Example 4

In the each of the above-described embodiments, a total of 80 types of the transformed average face images $tA_0(x)$ acquired by performing a total of 80 types ($=3\times3\times3\times3-1$) of transformation corresponding to combinations of three-level values for each of four global parameters (the size, the tilt, the positions on the upper and lower sides, and the positions located on the left and the right sides) are set in advance for the average face image $A_0(x)$. However, the types and the number of the parameters used for setting the transformed average face images $tA_0(x)$ or the number of levels of the parameter values can be changed. For example, only some of the four global parameters may be configured to be used for setting the transformed average face images $tA_0(x)$. Alternatively, at least some of the global parameters and a predetermined number of the shape parameters $p_i$ may be configured to be used for setting the transformed average face images $tA_0(x)$. Furthermore, the transformed average face images $tA_0(x)$ may be configured to be set by performing a transformation corresponding to combinations of five-level values for each used parameter.

C5. Modified Example 5

In the updating process (FIG. 14) for the disposition of the characteristic position CP in each of the above-described embodiments, by calculating the average shape image I(W(x; p)) based on the target image OI, the disposition of the characteristic points CP of the target image OI is matched to the disposition of the characteristic points CP of the average face image $A_0(x)$. However, both the dispositions of the characteristic points CP may be configured to be matched to each other by performing an image transformation for the average face image $A_0(x)$.

C6. Modified Example 6

In each of the above-described embodiments, the face area FA is detected, and the assumed reference area ABA is set based on the face area FA. However, the detection of the face area FA needs not to be performed necessarily. For example, the assumed reference area ABA may be set by user's direct designation.

C7. Modified Example 7

In each of the above-described embodiments, the sample face image SI (FIG. 3) is only an example, and the number and the types of images used as the sample face images SI may be set arbitrarily. In addition, the predetermined characteristic portions (see FIG. 4) of a face that are represented in the positions of the characteristic points CP in each of the above-described embodiments are only an example. Thus, some of the characteristic portions set in the above-described embodiments can be omitted, or other portions may be used as the characteristic portions.

In addition, in each of the above-described embodiments, the texture model is set by performing principal component analysis for the luminance value vector that is configured by luminance values for each pixel group x of the sample face image SIw. However, the texture mode may be set by performing principal component analysis for index values (for example, RGB values) other than the luminance values that represent the texture (appearance) of the face image.

In addition, in each of the above-described embodiments, the size of the average face image $A_0(x)$ is not limited to 56 pixels×56 pixels and may be configured to be different. In addition, the average face image $A_0(x)$ needs not to include the mask area MA (FIG. 7) and may be configured by only the average shape area BSA. Furthermore, instead of the average face image $A_0(x)$, a different reference face image that is set based on statistical analysis for the sample face images SI may be used.

In addition, in each of the above-described embodiments, the shape model and the texture model that use the AAM are set. However, the shape model and the texture model may be set by using any other modeling technique (for example, a technique called a Morphable Model or a technique called an Active Blob).

In addition, in each of the above-described embodiments, the image stored in the memory card MC is configured as the target image OI. However, for example, the target image OI may be an image that is acquired through a network.

In addition, in each of the above-described embodiments, the image processing performed by using the printer 100 as an image processing apparatus has been described. However, a part of or the whole processing may be configured to be performed by an image processing apparatus of any other type such as a personal computer, a digital still camera, or a digital video camera. In addition, the printer 100 is not limited to an ink jet printer and may be a printer of any other type such as a laser printer or a sublimation printer.

In each of the above-described embodiments, a part of the configuration that is implemented by hardware may be replaced by software. On the contrary, a part of the configuration implemented by software may be replaced by hardware.

In addition, in a case where a part of or the entire function according to an embodiment of the invention is implemented by software (computer program), the software may be provided in a form being stored on a computer-readable recording medium. The "computer-readable recording medium" in an embodiment of the invention is not limited to a portable recording medium such as a flexible disk or a CD-ROM and includes various types of internal memory devices such a RAM and a ROM and an external memory device of a computer such as a hard disk that is fixed to a computer.

What is claimed is:

1. An image processing apparatus that specifies a position of a predetermined characteristic portion of a target face image, the image processing apparatus comprising:
    an initial disposition unit that determines an initial disposition of a characteristic point of the target face image based on a disposition of the characteristic point of a reference face image that is set based on a statistical analysis on a plurality of sample face images of which dispositions of the characteristic points representing the positions of the characteristic portions are known;
    an image transforming unit that performs a first transformation for at least one of the reference face image and the target face image, so that disposition patterns of the characteristic points of the reference face image and the target face image are identical to each other;
    a normalization unit that performs a first normalization process, in which predetermined first index values that represent distributions of pixel values of the reference face image and the target face image approach each other, for at least one of the reference face image and the target face image after the first transformation;
    a determination unit that compares the reference face image with the target face image after the first normalization process and determines whether to update the disposition of the characteristic point of the target face image based on a result of the comparison; and
    an update unit that updates the disposition of the characteristic point of the target face image based on the result of the comparison between the reference face image and the target face image in a case where the update is determined to be performed.

2. The image processing apparatus according to claim 1, wherein the determination unit calculates a predetermined second index value that represents the degree of difference between the reference face image and the target face image based on the result of comparing the reference face image with the target face image and determines whether to perform the update based on a result of comparing the second index value with a threshold value.

3. The image processing apparatus according to claim 2, wherein the normalization unit performs a second normalization process, in which the first index values of the reference face image and the target face image approach each other, for at least one of the reference face image and the target face image in a reference correspondence relationship, which is a correspondence relationship between the reference face image and the target face image, that becomes a reference and transformed correspondence relationships of N types that are correspondence relationships between the reference face image and the target face image at a time when the second transformations of N (here, N is an integer equal to or greater than one) types are performed for at least one of the reference face image and the target face image with reference to the reference correspondence relationship, and
    wherein the initial disposition unit selects the correspondence relationship, for which the degree of difference between the reference face image and the target face image after the second normalization process is the smallest, from among the reference correspondence relationship and the transformed correspondence relationships and determines the initial disposition of the characteristic point of the target face image based on the disposition of the characteristic point of the reference face image in the selected correspondence relationship.

4. The image processing apparatus according to claim 3, wherein the second transformations of N types are transformations in which at least one of parallel movement, a change in tilt, and enlargement or reduction of the entire characteristic point is performed.

5. The image processing apparatus according to claim 4, wherein the first index value includes at least one of an average value and a variance value of pixel values.

6. The image processing apparatus according to claim 5, wherein the reference face image is an average image of the plurality of sample face images that has been transformed such that the disposition of the characteristic point is identical to an average shape that represents an average position of the characteristic points of the plurality of sample face images.

7. The image processing apparatus according to claim 6, further comprising: a face area detecting unit that detects an image area, which includes at least a part of a face image, from the target face image as a face area,
    wherein the initial disposition unit that determines the initial disposition of the characteristic point in the target face image based on at least one of the position, the size, and the tilt of the face area of the target face image.

8. The image processing apparatus according to claim 7, wherein the first transformation is an affine transformation for each polygonal area having the characteristic points set in the reference face image and the target face image as apexes thereof.

9. The image processing apparatus according to claim 8, further comprising: a memory unit storing model information that is used for specifying the disposition model of the characteristic point that is a model of the characteristic point set based on the statistical analysis and is acquired by a sum of an average shape that represents an average position of the characteristic points of the plurality of sample face images and a linear combination of shape vectors representing the characteristics of the disposition of the characteristic points of the plurality of sample face images therein,
    wherein the update unit updates the disposition of the characteristic point of the target face image by changing a coefficient of at least one of the shape vectors in the disposition model that represents the disposition of the characteristic point of the target face image based on the result of comparing the reference face image with the target face image.

10. An image processing method of specifying a position of a predetermined characteristic portion of a target face image, using a computer comprising:
   determining an initial disposition of a characteristic point of the target face image based on a disposition of the characteristic point of a reference face image that is set based on a statistical analysis on a plurality of sample face images of which dispositions of the characteristic points representing the positions of the characteristic portions are known;
   performing a first transformation for at least one of the reference face image and the target face image, so that disposition patterns of the characteristic points of the reference face image and the target face image are identical to each other;
   performing a first normalization process, in which predetermined first index values that represent distributions of pixel values of the reference face image and the target face image approach each other, for at least one of the reference face image and the target face image after the first transformation;
   comparing the reference face image with the target face image after the first normalization process and determining whether to update the disposition of the characteristic point of the target face image based on a result of the comparison; and
   updating the disposition of the characteristic point of the target face image based on the result of the comparison between the reference face image and the target face image in a case where the update is determined to be performed.

11. A non-transitory computer readable medium storing a computer program for specifying a position of a predetermined characteristic portion of a target face image, the computer program implements, in a computer, functions comprising:
   a function for determining an initial disposition of a characteristic point of the target face image based on a disposition of the characteristic point of a reference face image that is set based on a statistical analysis on a plurality of sample face images of which dispositions of the characteristic points representing the positions of the characteristic portions are known;
   a function for performing a first transformation for at least one of the reference face image and the target face image, so that disposition patterns of the characteristic points of the reference face image and the target face image are identical to each other;
   a function for performing a first normalization process, in which predetermined first index values that represent distributions of pixel values of the reference face image and the target face image approach each other, for at least one of the reference face image and the target face image after the first transformation;
   a function for comparing the reference face image with the target face image after the first normalization process and determining whether to update the disposition of the characteristic point of the target face image based on a result of the comparison; and
   a function for updating the disposition of the characteristic point of the target face image based on the result of the comparison between the reference face image and the target face image in a case where the update is determined to be performed.

* * * * *